United States Patent [19]

Ohata et al.

[11] Patent Number: 4,904,633

[45] Date of Patent: Feb. 27, 1990

[54] CATALYST FOR PURIFYING EXHAUST GAS AND METHOD FOR PRODUCTION THEREOF

[75] Inventors: Tomohisa Ohata; Kazuo Tsuchitani; Eiichi Shiraishi; Shinya Kitaguchi, all of Himeji, Japan

[73] Assignee: Nippon Shokubai Kagaku Kogyo Co., Ltd., Osaka, Japan

[21] Appl. No.: 134,363

[22] Filed: Dec. 17, 1987

[30] Foreign Application Priority Data

| Dec. 18, 1986 | [JP] | Japan | 61-299948 |
| Jan. 20, 1987 | [JP] | Japan | 62-9109 |
| Jan. 20, 1987 | [JP] | Japan | 62-9110 |
| Jan. 21, 1987 | [JP] | Japan | 62-10009 |
| Jan. 21, 1987 | [JP] | Japan | 62-10010 |
| Jan. 23, 1987 | [JP] | Japan | 62-12288 |
| Jan. 23, 1987 | [JP] | Japan | 62-12289 |
| Jan. 29, 1987 | [JP] | Japan | 62-17321 |
| Jan. 30, 1987 | [JP] | Japan | 62-18219 |

[51] Int. Cl.$^4$ .................. B01J 21/06; B01J 23/10; B01J 23/40
[52] U.S. Cl. .................. 502/304; 502/242; 502/261; 502/262; 502/302; 502/303; 502/325; 502/328; 502/332; 502/333; 502/334; 423/213.5
[58] Field of Search ............... 502/303, 304, 325, 332, 502/333, 334, 242, 261, 262, 302, 328; 423/213.5

[56] References Cited

U.S. PATENT DOCUMENTS

| 3,928,239 | 12/1975 | Yonehara et al. | 502/333 |
| 4,021,185 | 5/1977 | Hindin et al. | 431/7 |
| 4,172,047 | 10/1979 | Gandhi et al. | 252/466 P |
| 4,233,189 | 12/1980 | Gandhi et al. | 252/472 |
| 4,294,726 | 10/1981 | Bozon et al. | 252/462 |
| 4,367,162 | 1/1983 | Fujitani et al. | 502/304 X |
| 4,504,598 | 3/1985 | Ono et al. | 502/303 |
| 4,619,909 | 10/1986 | Ono et al. | 502/303 |
| 4,621,071 | 11/1986 | Blanchard et al. | 502/333 X |
| 4,624,940 | 11/1986 | Wan et al. | 502/303 X |
| 4,678,770 | 7/1987 | Wan et al. | 502/304 |
| 4,714,694 | 12/1987 | Wan et al. | 502/334 X |

FOREIGN PATENT DOCUMENTS

| 0142858 | 11/1983 | European Pat. Off. |
| 0125565 | 1/1984 | European Pat. Off. |
| 57-29215 | 6/1982 | Japan |
| 57-153737 | 9/1982 | Japan |

Primary Examiner—W. J. Shine
Attorney, Agent, or Firm—Omri M. Behr

[57] ABSTRACT

A catalyst for purifying exhaust gas comprises a honeycomb carrier of monolithic structure and a coating layer deposited on the honeycomb carrier and formed with a catalyst composition containing a refractory inorganic oxide in the form of particles possessing and average particle diameter in the range of 0.5 to 20 microns, which refractory inorganic oxide has platinum and/or palladium and rhodium deposited thereon in high concentrations. This catalyst is produced by coating the honeycomb carrier with an aqueous slurry containing the catalyst composition and calcining the coated carrier.

37 Claims, No Drawings

CATALYST FOR PURIFYING EXHAUST GAS AND METHOD FOR PRODUCTION THEREOF

BACKGROUND OF THE INVENTION

1. Field of the Invention

This invention relates to a catalyst for purifying exhaust gas. More particularly, it relates to a catalyst for purifying the exhaust gas from the internal combustion engine such as of an automobile for simultaneous removal from the exhaust gas of noxious components such as hydrocarbon (HC), carbon monoxide (CO), and nitrogen oxides (NOx), which catalyst especially exhibits outstanding durability even when it is used under harsh conditions such as under a high-temperature oxidative atmosphere and manifests a high purifying ability to the aforementioned noxious components at low temperatures.

2. Description of the Prior Art

In the conventional noble metal-containing catalyst for purifying the exhaust gas, for the purpose of ensuring effective use of the noble metal contained in a very minute amount in the catalyst, efforts have been made to allow the noble metal to be deposited in as high a degree of dispersion as possible on a refractory inorganic oxide of a large surface area such as activated alumina. The catalyst having the noble metal carried in a high degree of dispersion enjoys a high initial activity. When it is exposed to such harsh conditions as involved under a high-temperature oxidative atmosphere, however, the noble metal gains gradually in particle size, undergoes a chemical conversion into a less active state, and tends to induce a reaction with the carrier substance and cerium oxide. Because the noble metal is deposited in the high degree of dispersion, there tends to ensue a disadvantage that the degradation of catalytic activity is rather heavy.

In this field, zirconia is used more often than not as incorporated chiefly in a carrier substrate for the purpose of stabilizing the physical properties of the catalyst such as specific surface area. To cite a case using zirconia as a carrier substrate for a noble metal, Japanese Patent Publication No. SHO 57(1982)-29,215 and Japanese Patent Laid-Open No. SHO 57(1982)-153,737 disclose a method which comprises forming on a carrier a coating layer containing alumina and zirconia and subsequently depositing a noble metal thereon. The catalyst produced by the method of this principle, however, suffers from the degradation of catalytic activity due to the same cause as mentioned above because the greater part of the noble metal is substantially dispersed in a high ratio in the alumina.

As carrier substances incapable of interacting noble metals, particularly rhodium, zirconia (U.S. Pat. No. 4,233,189) and alpha alumina (U.S. Pat. No. 4,172,047) have been known in the art. Zirconia and alpha alumina generally possess small surface areas. It has been pointed out, however, that the catalysts having rhodium carried on these substances have a disadvantage that exhibit poor initial activity and possess no satisfactorily high ability to purify the exhaust gas at low temperatures after long term using.

An object of this invention, therefore, is to provide a novel catalyst for purifying the exhaust gas and a method for the production thereof.

Another object of this invention is to provide a catalyst for purifying the exhaust gas which exhibits outstanding durability even when it is used under harsh conditions and possesses a notable ability to purify thoroughly the exhaust gas of the noxious components thereof even at low temperatures and a method for the production thereof.

SUMMARY OF THE INVENTION

The objects of the invention described above are accomplished by a catalyst for purifying the exhaust gas, produced by coating a honeycomb carrier of monolithic structure with a catalyst composition comprising a platinum group metal carrying zirconia obtained by depositing the platinum group metal on zirconia powder, a refractory inorgnic oxide, and a rare earth metal oxide.

The objects are also accomplished by a method for the production of a catalyst for purifying the exhaust gas, which method comprises preparing an aqueous slurry containing a platinum group metal-carrying zirconia, a refractory inorganic oxide, and a rare earth metal oxide, coating a honeycomb carrier of monolithic structure with the aqueous slurry, and subsequently calcining the resultant coated carrier.

These objects are further accomplished by a catalyst for purifying the exhaust gas, produced by coating a honeycomb carrier of monolithic structure with a catalyst composition consisting of the following noble metal containing refractory inorganic oxides, the average particle diameter of which is adjusted in the range of 0.5 to 20 microns (A) at least one refractory inorganic oxide selected from the group consisting of (a) a refractory inorganic oxide having carried thereon 5 to 30% by weight of at least one noble metal selected from the group consisting of platinum and palladium and (b) a refractory inorganic oxide having carried thereon 1 to 20% by weight of rhodium or (B) a refractory inorganic oxide having carried thereon 5 to 30% by weight of at least a noble metal selected from the group consisting of platinum and palladium and 1 to 20% by weight of rhodium.

The objects described above are also accomplished by a method for the production of a catalyst for purifying the exhaust gas, which method comprises preparing a catalyst composition containing refractory inorganic oxides, the average particle diameter of which is adjusted in the range of 0.5 to 20 microns (A) at least one refractory inorganic oxide selected from the group consisting of (a) a refractory inorganic oxide having carried thereon 5 to 30% by weight of at least one noble metal selected from the group consisting of platinum and palladium and (b) a refractory inorganic oxide having carried thereon 1 to 20% by weight of rhodium or (B) a refractory inorganic oxide having carried thereon 5 to 30% by weight of at least one noble metal selected from the group consisting of platinum and palladium and 1 to 20% by weight of rhodium and coating a honeycomb carrier of monolithic structure with the catalyst composition, and subsequently calcining the coated carrier.

We have found, as the result of a diligent study, that directly contrary to the conventional theory that the noble metal which must be used in a very minute amount ought to be deposited in a small ratio on the refractory inorganic oxide of a large surface area so as to heighten the degree of dispersion of the noble metal to the highest possible extent, a noble metal-containing refractory inorganic oxide produced by depositing the noble metal in a high ratio on a small amount of refractory inorganic oxide gives rise to a catalyst of surprisingly high durability when the aforementioned noble metal-containing refractory inorganic oxide is adjusted in the form of cohesive particles of a relatively large average particle diameter in the range of 0.5 to 20 microns and dispersed in a catalyst coating layer. The present invention has been perfected as the result.

EXPLANATION OF THE PREFERRED EMBODIMENTS

The catalyst composition in the first aspect of this invention comprises a zirconia having deposited thereon a platinum group metal at least a rhodium-containing, a refractory inorganic oxide, and a rare earth metal oxide.

The zirconia to be used in the first aspect of this invention possesses a specific surface area exceeding 10 $m^2/g$, preferably falling in the range of 60 to 100 $m^2/g$. The primary particles of this zirconia possess an average particle diameter of not more than 2,000 Å, preferably not more than 500 Å. A commercially available zirconia may be used on condition that it satisfies these requirements. Otherwise the zirconia may be prepared, for example, by a method which comprises neutralizing an aqueous solution of zirconium salt as with ammonia, washing the product of neutralization, drying and calcining the washed product.

The amount of the zirconia to be used generally is in the range of 0.5 to 50% by weight, based on the amount of the catalyst composition. Even when it is used in an amount falling in the range of 0.5 to 10% by weight, the produced catalyst composition is capable of fully manifesting the effect contemplated by the invention. If the amount of the zirconia exceeds 50% by weight, the individual particles of zirconia gain in growth of particle diameter at an accelerated rate possibly to impair the catalytic activity of the composition. The platinum group metal deposited on the zirconia is required to incorporate therein rhodium. Further incorporation of platinum and/or palladium is observed to bring about an improvement further in the low-temperature activity of the catalyst after long term using at elevated temperatures. The total amount of platinum and palladium to be incorporated in addition to rhodium desirably falls in the range of 1/5 to 5 in gravimetric ratio, based on the amount of rhodium. Thus, the noble metal-carrying zirconia contains such noble metals in a total concentration falling in the range of 0.5 to 30% by weight, preferably 1 to 20% by weight.

The platinum group metal except for rhodium is not required to be wholly deposited on the zirconia. It may be deposited on a refractory inorganic oxide such as alumina or on a rare earth metal oxide. The deposition of the noble metal on the zirconia may be effected by any of the conventional methods and need not be carried out by any specific method. Rhodium chloride, rhodium nitrate, and rhodium sulfate can be used as rhodium sources and platinic chloride, dinitrodiammine platinum, palladium chloride, and palladium nitrate as platinum or paladium sources, all in the form of an aqueous solution or an alcoholic solution. Where two or more platinum group metals are to be deposited on the zirconia, this deposition may be effected by impregnating the metals either separately or collectively in the solution. Then, by drying and calcining the impregnated zirconia, the noble metals are deposited fast on the zirconia.

As examples of the refractory inorganic oxide to be used effectively in the first aspect of the present invention, there may be cited alumina, silica, titania, magnesia, and zirconia. It is desirable to use alumina, particularly activated alumina among other refractory inorganic oxides cited above. This alumina may be used in any of possible crystalline forms such as $\gamma$, $\delta$, $\theta$, $\alpha$, $\zeta$, $\kappa$, and $\eta$. Though the refractory inorganic oxide may be directly incorporated in the unmodified form in the catalyst composition, it is enabled to contribute to further enhancing the catalyst composition's purifying ability by incorporating therein rare earth metals and such base metal elements as chromium, manganese, iron, cobalt, nickel, and zirconium in the form of oxides in a total amount falling in the range of 0.1 to 30% by weight, preferably 2 to 20% by weight, based on the amount of the refractory inorganic oxide such as, for example, alumina.

As examples of the rare earth metal oxide, there can be cited the oxides of cerium, lanthanum, and neodymium. It is particularly desirable to use cerium oxide among other rare earth metal oxides enumerated above.

The rare earth metal oxide can be deposited in an amount falling in the range of 0.1 to 30% by weight, preferably 2 to 20% by weight, on the refractory inorganic oxide such as alumina as mentioned above. Otherwise, it can be incorporated directly in the catalyst composition in the form of oxide, carbonate or hydroxide, which may be converted into a corresponding oxide by calcing or actual using. In the latter case of incorporation, the oxide can be incorporated in an amount falling in the range of 5 to 80% by weight, preferably 10 to 50 % by weight, in the catalyst composition.

In the first aspect of the present invention, since the platinum group metal, particularly the platinum group metal containing rhodium, is stably deposited on the zirconia in the form of microfine particles possessing a very large surface area, the possible adverse effects arising from the interaction among the carrier substance, the rare earth metal oxide, and the base metal oxide can be curbed and the catalyst composition is enabled to incorporate therein the rare earth metal oxide and the base metal oxide in larger amounts than heretofore permitted and, as the result, the catalyst composition is allowed to possess notably improved durability and purifying ability.

The zirconia having deposited therein the platinum group metal, particularly the platinum group metal containing rhodium, the rare earth group oxide, and the refractory inorganic oxide which have been obtained as described above are ground and stirred as in a ball mill to produce an aqueous slurry. A finished catalyst is then produced by coating a honeycomb carrier of monolithic structure with the aqueous slurry, and optionally calcining the dried carrier. This calcining is performed at a temperature in the range of 100° to 600° C., preferably 130° to 300° C. for a period in the range of 1 to 10 hours, preferably 1 to 3 hours.

The catalyst composition in the second aspect of the present invention comprises (A) (a) a refractory inorganic oxide having carried therein platinum and/or palladium and/or (b) a refractory inorganic oxide having carried thereon rhodium or (B) a refractory inorganic oxide having carried thereon platinum and/or palladium and rhodium and optionally incorporates therein (C) cerium oxide and/or (D) a refractory inorganic oxide containing no deposited noble metal.

The range of the high ratio of deposition of the noble metal on the refractory inorganic oxide is 5 to 30% by weight, preferably 10 to 20% by weight, in the case of platinum and/or palladium and 1 to 20% by weight, preferably 1 to 10% by weight, in the case of rhodium. If the ratio of deposition of platinum and/or palladium is less than 5% by weight or that of rhodium is less than 1% by weight, the state of dispersion approximates that in the conventional catalyst and the catalyst composition, therefore, incurs heavy degradation of catalytic activity. If the ratio of deposition of platinum and/or palladium exceeds 30% by weight or that of rhodium exceeds 20% by weight, the active sites of the noble metal which contribute effectively to the reaction are not increased but are rather decreased even at the initial stage and as the result the catalyst shows poor initial activity. Moreover, the noble metal entails notable growth of particle size, a phenomenon not observed where the ratio of deposition falls in the range defined by the present invention. This growth of particle size results in a serious degradation of catalyst activity.

Optionally, platinum and/or palladium and rhodium may be (A) independently deposited on separate portions of the refractory inorganic oxide and the noble metal-carrying refractory inorganic oxide portions consequently obtained may be used either independently or as suitably combined. Otherwise, these noble metals may be (B) collectively deposited on one and the same portion of the refractory inorganic oxide. When the noble metals are collectively deposited on one and the same portion of the refractory inorganic oxide, the total amount of the noble metals so deposited is desired to fall in the range of 6 to 40% by weight, preferably 11 to 30% by weight, in order for the produced catalyst to give satisfactory results. The catalyst durability is improved by having platinum and/or palladium and rhodium deposited both in high ratios. This improvement of durability may be logically explained by a supposition that the interaction between platinum and rhodium, for example, curbs the formation of irreversible rhodium oxide which is not easily reduced to an active rhodium metal. It is also surprising to note that no discernible inactivation of the catalyst is brought about by the alloyage of platinum with rhodium so long as the ratio of deposition falls within the range specified by this invention.

The second characteristic of the second aspect of the present invention resides in the fact that the refractory inorganic oxide having the noble metals deposited thereon in high ratios is dispersed in the form of particles of a relatively large particle diameter falling in the range of 0.5 to 20 microns, preferably 1 to 15 microns. By regulating the average particle diameter in this range, the interaction and the reaction between the noble metals and the refractory inorganic oxide can be mitigated without a sacrifice of the efficiency of the reaction for purifying the exhaust gas.

Owing to the combination of the characteristics described above, the catalyst of this invention which is produced by coating a honeycomb carrier of monolithic structure with 1 to 20 g, preferably 2 to 15 g per liter of the refractory inorganic oxide having noble metals deposited thereon in high ratios and possessing an average particle diameter in the range of 0.5 to 20 microns and, if desired, 50 to 200 g, preferably 50 to 150 g per liter, of the refractory inorganic oxide containing no noble metal, each per liter of the carrier exhibits highly satisfactory durability under harsh conditions such as under a high-temperature oxidative atmosphere.

For the platinum and palladium to be used in the second aspect, platinic chloride, dinitro-diammine platinum, platinum-sulfite complex, platinum tetramine chloride, palladium chloride, and palladium nitrate, for example, are desirable sources. As rhodium sources, rhodium nitrate, rhodium chloride, rhodium sulfate, rhodium-sulfite complex, and rhodium-ammine complex are desirable.

As examples of the refractory inorganic oxide to be used in this invention, there can be cited alumina, silica, titania, zirconia, alumina-silica, alumina-titania, alumina-zirconia, silica-titania, silica-zirconia, titania-zirconia, and alumina-magnesia. It is particularly desirable to use alumina, particularly activated alumina, and zirconia among other refractory inorganic oxides enumerated above. The activated alumina is desired to be of a grade possessing a specific surface area in the range of 5 to 200 m$^2$/g, preferably 50 to 180m$^2$/g. This invention does not discriminate the activated alumina on account of the crystalline form thereof. The activated alumina can be used in any of all possible crystalline forms such as $\gamma$, $\delta$, $\theta$, $\alpha$, $\zeta$, $\kappa$, and $\eta$. An activated alumina which has at least one element selected from the group consisting of rare earth metals such as lanthanum, cerium, and neodymium, alkaline earth elements such as calcium and barium, and metal elements such as chromium, manganese, iron, cobalt, nickel, and zirconium deposited thereon in the form of an oxide in an amount falling in the range of 0.1 to 30% by weight, preferably 0.2 to 20 % by weight, is also usable.

In the case of using a zirconia in this invention, it is desirably possesses the zirconia to be used in this invention possesses a specific surface area exceeding at least 10 m$^2$/g, preferably falling in the range of 60 to 100 m$^2$/g, and an average primary particle diameter not exceeding 2,000 Å, preferably not exceeding 500 Å.

A commercially available zirconia may be used so long as it possesses the physical properties specified above. The zirconia of the foregoing description may be prepared, for example, by neutralizing an aqueous solution of zirconia salt as with ammonia and washing with water, drying, and calcining the product of the neutralization. A zirconia which is stabilized with not more than 10% by weight, preferably not more than 8 % by weight, of yttrium or an alkaline earth metal such as calcium is also usable.

The catalyst composition made of the aforementioned noble metal-carrying refractory inorganic oxide may incorporate therin cerium oxide when necessary for the purpose of further enhancing the effect thereof.

As the source for the cerium oxide to be used in the second aspect of the present invention, any starting material can be used so long as it is capable of existing as cerium dioxide (CeO$_2$) in the finished catalyst. For example, commercially available CeO$_2$, cerium carbonate, and cerium hydroxide are available as cerium oxide sources. Alternatively, the incorporation of cerium oxide may be attained by impregnating the refractory inorganic oxide with a cerium salt solution such as, for example, an aqueous cerium nitrate solution. The catalyst of this invention is enabled to manifest the properties thereof to greater advantage by using as a ceria an alumina-modified cerium oxide which is obtained by impregnating a water-insoluble cerium compound with at least one member selected from the group consisting of water-soluble aluminum compounds and alumina hydrates and calcining the product of impregnation.

As examples of the water-insoluble cerium compound, there can be cited cerium oxide, cerium hydroxide, and cerium carbonate. It is particularly desirable to use cerium carbonate among other cerium compounds cited above. This water-insoluble cerium compound is used in the form of fine powder having a particle diameter in the range of 0.1 to 100 microns, preferably 0.2 to 80 microns. As examples of the water-soluble aluminum compound and/or alumina hydrate, there can be cited aluminum nitrate, aluminum chloride, aluminum sulfate, gypsite, bayerite, boehmite, alumina gel, and almina sol. It is especially desirable to use aluminum nitrate among other water-soluble aluminum compounds cited above.

The amounts of the water-insoluble cerium compound and the water-soluble aluminum compound and/or alumina hydrate to be used are not specifically limited. It is preferred however that the amount of cerium oxide incorporated is in the range of 1 to 150 grams as cerium oxide per liter of carrier. The use of these compounds permits effective production of an alumina-modified cerium oxide. Desirably, the atomic ratio of cerium to aluminum, Ce/Al, is in the range of 1 to 20, preferably 2 to 10. After the water-insoluble cerium compound is impregnated with the water-soluble aluminum compound and/or the alumina hydrate, the product of this impregnation is generally dried at a temperature in the range of 100° to 300° C. and then calcined in the air at a temperature in the range of 300° to 700° C. to give rise to an alumina-modified cerium oxide.

The refractory inorganic oxide having noble metals deposited thereon at high ratios as specified by the present invention is adjusted to an average particle diameter in the range of 0.5 to 20 microns. This adjustment of the average particle diameter is attained, for example, by impregnating the aforementioned refractory inorganic oxide in the form of powder or pellets with noble metal compounds and then pulverizing the product of impregnation as with a mill to a desired particle diameter.

This treatment gives rise to a slurry containing a powder of adjusted particle diameter. By wash coating a honeycomb of monolithic structure with this slurry and then calcining the coated carrier, there is obtained a finished catalyst. The calcination is performed at a temperature falling generally in the range of 100° to 600° C., preferably 130° to 300° C. for a period in the range of 1 to 10 hours, preferably 1 to 3 hours.

The honeycomb carrier of monolithic structure to be used in the first and second aspects of the present invention can be any of honeycomb carriers referred to by the generic term "ceramic honeycomb carrier." The honeycomb carriers formed with such materials as cordierite, mullite, -alumina, zirconia, titania, titanium phosphate, aluminum titanate, petalite, spodumene, alumino silicate, and magnesium silicate prove to be particularly desirable. Those made of cordieritic substance are used particularly advantageously in the catalyst for use in the internal combustion engine among other materials enumerated above. Honeycomb carriers formed in monolithic structure with a metal such as stainless steel or Fe-Cr-Al alloy which is resistant to oxidation and to heat can be used too. The monolithic carrier of the preceding description can be produced, for example, by the extrusion molding method or the method of tightly rolling a sheetlike element. The openings (cells) formed in the monolithic honeycomb carrier for passage of the gas under treatment may be in a hexagonal, tetragonal, trigonal, or corrugated shape. The honeycomb carrier functions very satisfactorily when the cell density (number of cells per unit cross sectional area) is in the range of 150 to 600 cells/square inch.

Now, the present invention will be described more specifically with reference to working examples. Needless to mention, this invention is not limited only to these working example.

EXAMPLE 1

A 10.0-g portion of zirconia possessing a specific surface area of 70 $m^2/g$ and an average particle diameter of 200 Å (produced by Daiichi Kigenso kagaku K.K.) was impregnated with an aqueous rhodium chloride solution containing 0.3 g of rhodium and the impregnated zirconia was dried at 120° C. for 12 hours. Then, the dried zirconia was calcined in the air at 500° C. for 1 hour, to produce zirconia powder containing 2.9% by weight of rhodium. Then, 150 g of activated alumina possessing a specific surface area of 150 $m^2/g$ was impregnated with an aqueous platinic chloride solution containing 1.5 g of platinum. The impregnated activated alumina was dried at 150° C. for 12 hours and then calcined in the air at 500° C. for 1 hour, to afford a platinum-containing alumina powder. In a ball mill, the two powders obtained as described above and 75 g of commercially available cerium oxide powder were wet pulverized for 20 hours, to prepare an aqueous slurry. Monolithic carrier pieces of cordierite 33 mm in outside diameter and 76 mm in length containing about 400 gas flow cells per square inch of cross-sectional area were immersed in the aforementioned slurry, removed from the slurry, then blown with compressed air to remove excess slurry from inside the cells, and dried at 140° C. for 3 hours, to produce a catalyst A. This catalyst A, on analysis by the fluorescent X-ray, was found to contain 0.056 g of platinum and 0.011 g of rhodium per catalyst piece.

EXAMPLE 2

A zirconia powder containing 1.8% by weight of rhodium and 8.9% by weight of platinum was prepred by impregnating 15.0 g of the same zirconia powder as used in Example 1 in a mixture of an aqueous rhodium chloride solution containing 0.3 g of rhodium with an aqueous platinic chloride solution containing 1.5 g of plainum, drying the product of impregnation at 120° C. for 12 hours, and then calcining the dried powder in the air at 500° C. for 1 hour. In a ball mill, the zirconia powder and 145 g of the same activated alumina as used in Example 1 and 75 g of cerium oxide were wet pulverized for 20 hours, to produce an aqueous slurry. A catalyst B was obtained by following the procedure of Example 1 using this aqueous slurry. The catalyst B was found to contain 0.052 g of platinum and 0.010 g of rhodium per catalyst piece.

EXAMPLE 3

A catalyst C was obtained by following the procedure of Example 2, excepting a powder (iron-containing activated alumina) produced by impregnating 140 g of activated alumina with a solution of 25.3 g of ferric nitrate in 100 g of purified water and drying and calcining the product of impregnation was used in the place of the activated alumina of Example 2. The catalyst C was found to contain 0.054 g of platinum and 0.011 g of rhodium per catalyst piece.

CONTROL 1

An aqueous slurry was prepared by wet pulverizing 160 g of the same activated alumina and 75 g of the same cerium oxide as used in Example 1 in a ball mill for 20 hours. Then, by following the procedure of Example 1, monolithic carrier pieces of cordierite were wash coated with the aqueous slurry, dried at 140° C. for 3 hours, and then calcined in the air at 500° C. for 1 hour. The monolithic carrier pieces so treated were immersed in a mixed aqueous solution of platinic chloride and rhodium chloride, dried and calcined in the air at 400° C. for 1 hours, to produce a catalyst I. This catalyst I was found to contain 0.055 g of platinum and 0.011 g of rhodium per carrier piece.

CONTROL 2

An aqueous slurry was prepared by wet pulverizing 120 g of the same activated alumina as used in Example 1 and 120 g of a commercially available zirconia powder in a ball mill for 20 hours. Then, by following the procedure of Example 1, monolithic carrier pieces of cordierite were wash coated with the aqueous slurry, dried at 140° C. for 3 hours, and calcined in the air at 500° C. for 1 hour. The monolithic carrier pieces so treated were immersed in a mixed aqueous solution of platinic chloride and rhodium chloride, dried, and calcined in the air at 400° C. for 1 hour, to produce as catalyst II. This catalyst II was found to contain 0.056 g of platinum and 0.011 g of rhodium per carrier piece.

EXAMPLE 4

A zirconia powder containing 2.3% by weight of rhodium and 20.3% by weight of palladium was prepared by immersing 12.0 g of zirconia possessing a specific surface area of 90 m²/g and an average particle diameter of 150 Å (produced by Daiichi Kigenso Kagaku K.K.) in a mixture of an aqueous rhodium nitrate solution containing 0.35 g of rhodium with an aqueous palladium nitrate solution containing 3.15 g of palladium, drying the product of immersion at 120° C. for 12 hours, and then calcining the dried immersion product in the air at 500° C. for 1 hour.

An alumina powder containing $CeO_2$ and $Fe_2O_3$ was obtained by dissolving 56.1 g of cerium nitrate and 32.2 g of ferric nitrate in 200 g of purified water, mixing the resultant mixture with 200 g of an activated alumina possessing a specific surface area of 100 m²/g, drying the wet mixture at 120° C. for 12 hours, and then calcining the dried mixture in the air at 700° C. for 1 hour. An aqueous slurry was prepared by wet pulverizing the two powders obtained as described above in a ball mill for 20 hours. By following the procedure of Example 1, monolithic carrier pieces of cordierite were wash coated with the aqueous slurry and dried at 140° C. for 3 hours, to produce a catalyst D. This catalyst D was found to contain 0.120 g of palladium and 0.013 g of rhodium per carrier piece.

EXAMPLE 5

A zirconia powder containing 2.8% by weight of rhodium and 2.8% by weight of palladium was prepared by immersing 12.0 g of the same zirconia as used in Example 4 in a mixture of an aqueous rhodium nitrate solution containing 0.35 g of rhodium with an aqueous palladium nitrate solution containing 0.35 g of palladium, drying the product of immersion at 120° C. for 12 hours, and then calcining the dried product in the air at 500° C. for 1 hour.

Then, an aqueous solution of 56.1 g of cerium nitrate and 32.2 g of ferric nitrate in 200 g of purified water and an aqueous palladium nitrate solution containing 2.8 g of palladium were mixed. The resultant mixed solution was mixed with 200 g of an activated alumina possessing a specific surface area of 100 m²/g, dried at 120° C. for 12 hours, and then calcined in the air at 600° C. for 1 hour. In a ball mill, the two powders obtained as described above were wet pulverized for 20 hours, to produce an aqueous slurry. Then, a catalyst E was obtained by following the procedure of Example 1 using the aqueous slurry. This catalyst E was found to contain 0.121 g of palladium and 0.013 g of rhodium per carrier piece.

EXAMPLE 6

An aqueous slurry was prepared by wet pluverizing a zirconia powder containing 2.3.% by weight of rhodium and 20.3% by weight of palladium prepared by following the procedure of Example 4, 150 g of an activated alumina possessing a specific surface area of 90 m²/g, and 80 g of cerium oxide in a ball mill for 20 hours. A catalyst F was obtained by following the procedure of Example 1 using the aqueous slurry. This catalyst F was found to contain 0.115 g of palladium and 0.012 g of rhodium per catalyst piece.

CONTROL 3

A solution of 56.1 g of cerium nitrate and 32.2 g of ferric nitrate in 200 g of purified water was mixed with 200 g of an activated alumina possessing a specific surface area of 100 m²/g, dried at 120° C. for 12 hours, and then calcined in the air at 700° C. for 1 hour. An aqueous slurry was prepared by wet pulverizing the powder obtained as described above in a ball mill for 20 hours. Then, by following the procedure of Example 1, monolithic carrier pieces of cordierite were wash coated with the aqueous slurry, dried at 140° C. for 3 hours, and calcined in the air at 500° C. for 1 hour. A catalyst III was obtained by immersing the monolithic carrier pieces so treated in a mixed aqueous solution of palladium chloride and rhodium chloride, drying the product of immersion, and then calcining the dry product in the air at 400° C. for 1 hour. This catalyst III was found to contain 0.123 g of palladium and 0.013 g of rhodium per carrier piece.

CONTROL 4

A powder possessing a specific surface area of 5 m²/g and an average particle diameter of 5,000 Å was obtained by calcining a commerically available zirconia at 1,000° C. for 10 hours. A catalyst IV was obtained by following the procedure of Example 4, excepting the zirconia mentioned above was instead. The catalyst IV was found to contain 0.120 g of palladium and 0.013 g of rhodium per carrier piece.

EXAMPLE 7

The catalysts of Examples 1 through 3 and the catalysts of Controls 1 and 2 were tested for catalytic property during initial use and after aging in an electric furnace. The aging in the electric furnace was carried out in a high-temperature oxidative atmosphere of air involving very harsh conditions of 900° C. and 20 hours.

The evaluation of catalytic property was performed with an electronically controlled engine (4 cylinders 1,800 cc), with the gas temperature at the inlet to a catalyst bed continuously varied from 200° C. to 450° C. with a heat-exchanger to determine purifying ratios of CO, HC, and NOx. During this evaluation, the engine was operated as vibrated at a rate of 1 Hz, with the space velocity of gas (S.V.) fixed at 90,000 $hr^{-1}$ and the average air combustion ratio, A/F, at 14.6±0.5. The inlet gas temperatures ($T_{50}$) at which the purifying ratios of CO, HC, and Nox reached 50% were as shown in Table 1.

The catalyst of Examples 1 through 3 and the catalysts of Controls 1 and 2 were also tested for catalytic property after test run of engine. This test was carried out with an electronically controlled engine (8 cylinder 4,400 cc). With this motor operated in a mode of alternating 60 seconds' steady operation and 6 seconds' decelerated operation (during which period the fuel supply was cut and the catalyst was exposed to a high-temperature oxidative atmosphere) to effect 50 hours' aging of the catalyst under conditions such that the catalyst temperature would reach 850° C. in the steady operation.

The evaluation of the catalyst property after the test run of engine was carried out by the same procedure as described above. The results are shown in Table 2.

Then the catalyst of Examples 4 through 6 and the catalysts of Controls 3 and 4 were tested for catalytic property during initial use and after 50 hours' test run of engine. An electronically controlled engine (6 cylinders 2,400 cc) was used for the test run of engine mentioned above. The endurance test of engine was performed in a mode of alternating 30 seconds' exposure to an oxygen-lean atmosphere and as long exposure to an oxygen-rich atmosphere, introducing secondary air thereby varying the air combustion ratio, A/F, between 14.5 and 17.5. During the test, the catalyst temperature reached the maximum of 950° C.

The evaluation of catalytic property was performed with the same engine as used for the endurance test under the conditions of A/F=14.6 and SV=approximately 140,000 $hr^{-1}$, to determined the purifying ratios of HC, CO and NO. In the test during the initial use, the evalution was made at an inlet temperature of 500° C. In the test after the engine endurance test, the evalution was made at two inlet temperatures of 500° C. and 700° C. The results are shown in Tables 3 and 4.

It is clearly noted from the results that the catalysts of Example 1 through 3 and the catalysts of Examples 4 through 6 having noble metals deposited on zirconia of large surface area and minute particle diameter possessed highly desirable initial properties and exhibited very high durability even after harsh endurance conditions as in a high-temperature oxidative atmosphere.

TABLE 1

|  |  | Initial activity 50% conversion temperature (°C.) | | | After aging in electric furnace 50% conversion temperature | | |
| --- | --- | --- | --- | --- | --- | --- | --- |
|  |  | CO | HC | NOx | CO | HC | NOx |
| Example 1 | Catalyst A | 265 | 268 | 264 | 391 | 398 | 390 |
| 2 | B | 254 | 259 | 255 | 379 | 383 | 380 |
| 3 | C | 254 | 256 | 249 | 371 | 375 | 367 |
| Control 1 | I | 260 | 264 | 258 | 436 | 443 | 433 |
| 2 | II | 258 | 262 | 254 | 415 | 423 | 412 |

TABLE 2

|  |  | After aging by engine | | | | | |
| --- | --- | --- | --- | --- | --- | --- | --- |
|  |  | 50% conversion temperature (°C.) | | | Purifying ratio at 450° C. (%) | | |
|  |  | CO | HC | NOx | CO | HC | NOx |
| Example 1 | Catalyst A | 359 | 365 | 355 | 95 | 93 | 93 |
| 2 | B | 341 | 347 | 337 | 97 | 95 | 94 |
| 3 | C | 340 | 345 | 333 | 97 | 96 | 95 |
| Control 1 | I | 389 | 397 | 388 | 85 | 88 | 88 |
| 2 | II | 395 | 402 | 391 | 79 | 83 | 85 |

TABLE 3

|  |  | Initial activity Purifying ratio at 500° C. (%) | | |
| --- | --- | --- | --- | --- |
|  |  | CO | HC | NOx |
| Example 4 | Catalyst D | 95 | 95 | 93 |
| 5 | E | 96 | 97 | 94 |
| 6 | F | 97 | 98 | 97 |
| Control 3 | III | 96 | 97 | 94 |
| 4 | IV | 88 | 90 | 87 |

TABLE 4

|  |  | After aging by engine | | | | | |
| --- | --- | --- | --- | --- | --- | --- | --- |
|  |  | Purifying ratio at 500° C. (%) | | | Purifying ratio at 700° C. (%) | | |
|  |  | CO | HC | NO | CO | HC | NO |
| Example 4 | Catalyst D | 76 | 85 | 74 | 88 | 93 | 87 |
| 5 | E | 82 | 88 | 78 | 91 | 94 | 89 |
| 6 | F | 80 | 88 | 77 | 92 | 95 | 88 |
| Control 3 | III | 62 | 71 | 59 | 75 | 82 | 73 |
| 4 | IV | 61 | 73 | 56 | 81 | 86 | 79 |

EXAMPLE 8

A catalyst was prepared by using commercially available monolithic carrier pieces of cordierite (produced by NGK Insulators Ltd.). The monolithic carrier pieces were cylinders measuring 33 mm in outside diameer and 76 mm in length, containing about 400 gas flow cells per square inch of cross-sectional area, and possessing a volume of about 65 ml.

An alumina powder containing 16.7% by weight of platinum was prepared by mixing an aqueous solution of the nitrate of dinitro-diammine platinum containing 1.5g of platinum with 7.5g of an activated alumina possessing a specific surface area of 100 $m^2/g$, throroughly drying the resultant mixture, and then calcining the dried mixture in the air at 400° C. for 2 hours.

An alumina powder containing 9% by weight of rhodium was prepared by mixing an aqueous rhodium nitrate solution containing 0.3 g of rhodium with 3 g of the same activated alumina as described above, thoroughly drying the resultant mixture, and calcining the dried mixture in the air at 400° C. for 2 hours.

An aqueous slurry for coating was prepared by wet pulverizing 139g of the same activated alumina as described above, the aforementioned platinum-containing alumina powder, and the rhodium-containing alumina powder, in a ball mill for 20 hours. The aforementioned monolithic carrier pieces were immersed in the aqueous slurry for coating, removed from the slurry, and blown with compressed air to remove residual slurry from within the cells and relieve all the cells of clogging slurry. The wet carrier pieces were dried at 130° C. for 3 hours to obtain a finished catalyst.

The coating layer of this catalyst was photographed at 30 randomly selected spots through an electron prove microanalyzer (EPMA) at 3,000 magnifications to determined the conditions of platinum and rhodium distribution in the layer. It was consequently confirmed that platinum-containing alumina particles and rhodium-containing alumina particles both of an average particle diameter of 5 microns were dispersed in the layer. This catalyst was found to contain 100 g of alumina, 1.0 g of platinum, and 0.2 g of rhodium per liter of the catalyst.

EXAMPLE 9

A low ratio deposition alumina powder containing 0.2% by weight of rhodium was prepared by mixing an aqueous rhodium nitrate solution containing 0.3 g of rhodium with 142 g of an activated alumina possessing a specific surface area of 120 m$^2$/g, drying the resultant mixture, and calcining the dried mixture in the air at 400° C. for 2 hours.

A finished catalyst was obtained by following the procedure of Example 8, excepting the aforementioned rhodium-containing alumina powder was used in the place of the alumina powder containing 9% by weight of rhodium and the activated alumina used in Example 8.

When the coating layer of this catalyst was examined by EPMA, the platinum-containing alumina was found to be dispersed in the form of particles of an average particle diameter of 6 microns and no rhodium was detected as dispersed in the form of particles exceeding 0.5 microns in diameter.

This catalyst was found to contain 100 g of alumina, 1.0 g of platinum, and 0.2 g of rhodium per liter of the catalyst.

EXAMPLE 10

A low ratio deposition alumina powder containing 1% by weight of platinum was prepared by mixing an aqueous solution of the nitrate of dinitro-diammine platinum containing 1.5 g of platinum with 147 g of an activated alumina possessing a specific surface area of 120 m$^2$/g, drying the resultant mixture, and then calcining the dried mixture in the air at 400° C. for 2 hours.

A finished catalyst was obtained by following the procedure of Example 8, excepting the aforementioned platinum-containing alumina powder was used in the place of the alumina powder containing 16.7% by weight of platinum and the activated alumina as used in Example 8.

When the coating layer of this catalyst was examined by EPMA, the rhodium-containing alumina was dispersed in the form of particles possessing an average particle diameter of 4.5 microns and no platinum was found to be dispersed in the form of particles exceeding 0.5 microns in diameter. This catalyst was found to contain 100 g of alumina, 1.0 g of platinum, and 0.2 g of rhodium per liter of the catalyst.

EXAMPLE 11

A finished catalyst was obtained by following the procedure of Example 8, excepting an aqueous platinic chloride solution was used in the place of the aqueous solution of the nitrate of dinitro-diammine platinum. The platinum-containing alumina used in this case had 16.8% by weight of platinum deposited thereon.

When the coating layer of this catalyst was examined by EPMA, the platinum-containing alumina was found to be dispersed in the form of particles possessing an average particle diameter of 7 microns and the rhodium-containing alumina in the form of particles possessing an average particle diameter of 4 microns. This catalyst was found to contain 100 g of alumina, 1.0g of platinum, and 0.2 g of rhodium per liter of the catalyst.

EXAMPLE 12

A finished catalyst was obtained by following the procedure of Example 8, excepting an aqueous rhodium chlordie solution was used in the place of the aqueous rhodium nitrate solution. The rhodium-containing alumina used in this case had 8.9% by weight of rhodium deposited thereon.

When the coating layer of this catalyst was examined by EPMA, the platinum-containing alumina was found to be dispersed in the form of particles possessing an average particle diameter of 5 microns and the rhodium-containing alumina in the form of particles possessing an average particle diameter of 8 microns. This catalyst was found to contain 100 g of alumina, 1.0 g of platinum, and 0.2 g of rhodium per liter of the catalyst.

EXAMPLE 13

Metallic monolithic carrier cylinders 33 mm in diameter and 76 mm in length were formed by alternately superposing flat thin sheets of aluminum-containing ferrite stainless steel 60 microns in thickness and corrugated sheets produced by corrugating the same flat thin sheets to impart therein waves of a pitch of 2.5 mm. This carrier contained in the cross section thereof about 475 gas flow cells per square inch of cross-sectional area.

A finished catalyst was obtained by following the procedure of Example 8, excepting the aforementioned metallic monolithic carrier was used in the place of the monolithic carrier of cordierite.

When the coating layer of this catalyst was examined by EPMA, the platinum-containing alumina was found to be dispersed in the form of particles possessing an average particle diameter of 4 microns and the rhodium-containing alumina in the form of particles possessing an average particle diameter of 3.5 microns. This catalyst was found to contain 100 g of alumina, 1.0 g of platinum, and 0.2 g of rhodium per liter of the catalyst.

EXAMPLE 14

An aqueous slurry was obtained by wet pulverizing 139 g of the same activated alumina as used in Example 8 in a ball mill for 13 hours. Further an aqueous slurry for coating was obtained by wet pulverizing the aqueous slurry and the alumina powder containing 16.7% by weight of platinum and the alumina powder containing 9% by weight of rhodium prepared in Example 8 in a ball mill for 7 hours.

When the coating layer of this catalyst was examined by EPMA, the platinum-containing alumina was found to be dispersed in the form of particles possessing an average particle diameter of 15 microns and the rhodium-containing alumina in the form of particles possessing an average particle diameter of 10 microns. This catalyst was found to contain 100 g of alumina, 1.0 g of platinum, and 0.2 g of rhodium per liter of the catalyst.

CONTROL 5

An aqueous slurry was prepared by wet pulverizing 150 g of an activated alumina possessing a specific surface area of 100 m$^2$/g in a ball mill. The same monolithic carrier of cordierite as used in Example 8 was coated with the aqueous slurry.

In a mixed solution obtained by thoroughly stirring an aqueous solution of the nitrate of dinitro-diammine platinum containing 0.065 g of platinum and an aqueous rhodium nitrate solution containig 0.013 g of rhodium, the alumina-coated carrier was immersed and allowed to adsorb thereon all the platinum and rhodium present in the solution. The carrier was removed from the soltuion, treated for removal of the residual solution from within the cells by drainage, dried at 130° C. for 3 hours, and then calcined in the air at 400° C. for 2 hours, to obtain a finished catalyst.

When the coating layer of this catalyst was examined by EPMA, neigher platinum nor rhodium were found to be dispersed in the form of particles exceeding 0.5 micron in diameter. This catalyst was found to contain 100 g of alumina, 1.0 g of platinum, and 0.2 g of rhodium per liter of the catalyst.

CONTROL 6

An alumina powder containing 35.7% by weight of platinum was prepared by mixing an aqueous solution of the nitrate of dinitro-diammine platinum containing 1.5 g of platinum with 2.7 g of the same activated alumina as used in Control 5, thoroughly drying the resultant mixture, and then calcining the dried mixture in the air at 400° C. for 2 hours.

An alumina powder containing 21.4% by weight of rhodium was prepared by mixing an aqueous rhodium nitrate solution containing 0.3 g of rhodium with 1.1 g of the same activated alumina as described above, thoroughly drying the resultant mixture, and then calcining the dried mixture in the air at 400° C. for 2 hours.

A finished catalyst was obtained by following the procedure of Example 8, using the platinum-containing alumina powder and the rhodium-containing alumina powder mentioned above and 146 g of the same activated alumina as used above instead.

When the coating layer of this catalyst was examined by EPMA, the platinum-containing alumina and the rhodium-containing alumina were found to be dispersed in the form of particles possessing an average particle diameter of 6.5 microns. This catalyst was found to contain 100 g of alumina, 1.0 g of platinum, and 0.2 g of rhodium per liter of the catalyst.

CONTROL 7

An aqueous slurry was prepared by wet pulverizing 139 g of activated alumina pellets possessing a specific surface area of 120 m²/g in a ball mill for 19 hours. An aqueous slurry for coating was obtained by wet pulverizing this aqueous slurry and the alumina powder containing 16.7% by weight of platinum and the alumina powder containing 9% by weight of rhodium both prepared as in Example 8 in a ball mill for 1 hour. A finished catalyst was obtained by following the procedure of Example 8, using this coating slurry.

When the coating layer of this catalyst was examined by EPMA, the platinum-containing alumina was found to be dispersed in the form of particles possessing an average particle diamter of 30 microns and the rhodium-containing alumina in the form of particles possessing an average particle diameter of 40 microns. This catalyst was found to containing 100 g of alumina, 1.0 g of platinum, and 0.2 g of rhodium per liter of the catalyst.

CONTROL 8

An alumina powder containing 0.2% by weight of rhodium was prepared by mixing an aqueous rhodium nitrate solution containing 0.3 g of rhodium with 150 g of an activated alumina possessing a specific surface area of 120 m²/g, drying the resultant mixture, and then calcining the dried mixture in the air at 400° C. for 2 hours.

A finished catalyst was obtained by following the procedure of Example 8, excepting the aforementioned rhodium-containing alumina powder and 1.5 g of a commercially available platinum black possessing an average particle diameter of 1.0 micron (produced by Ishifuku Kinzoku Kogyo K.K.) were used instead.

When the coating layer of this catalyst was examined by EPMA, the platinum was found to be dispersed in the form of particles possessing an average particle diameter of 1 micron. This catalyst was found to contain 100 g of alumina, 1.0 g of platinum, and 0.2 g of rhodium per liter of the catalyst.

EXAMPLE 15

The catalysts of Examples 8 through 14 and the catalysts of Controls 5 through 8 were tested for catalytic property after aging in the electorc furnace.

This aging in the electric furnace was performed by exposing a given catalyst to a high-temperature oxidative atmosphere involving very harsh conditions of 10 hours' heating at 900° C.

The evaluation of the catalytic property was carried out by using a commercially available electronically controlled engine (4 cylinders 1,800 cc), with a multiconverter packed with the catalyst under treatment and connected to the exhaust system of the engine. The engine was operated, with the air combustion ratio, A/F, fixed at 14.6. By means of a heat-exchanger which was inserted in front of the catalyst converter in the exhaust system of the engine, the inlet gas temperature was continuously varied from 300° C. to 500° C. The gas was sampled at the inlet and the outlet of the catalyst converter and analyzed to determine the purifying ratios of CO, HC, and NO and evaluate the purifying ability of the catalyst at low temperatures.

The purifying ratios of CO, HC, and NO obtained as described above as the functions of the inlet gas temperature were plotted on a graph to find the inlet gas temperatures ($T_{50}$) showing a fixed purifying ratio of 50%. The inlet gas temperatures ($T_{50}$) thus determined were used as the standard for evaluation of the purifying property of catalyst at low temperatures.

The results obtained by the method of evaluation of catalytic property described above are shown in Table 5.

TABLE 5

| | Evaluation of catalytic property after aging in electric furnace | | |
|---|---|---|---|
| | Purifying property at low temperatures | | |
| Catalyst | CO purifying temperature, $T_{50}$ (°C.) | HC purifying temperature, $T_{50}$ (°C.) | NO purifying temperature, $T_{50}$ (°C.) |
| Example 8 | 395 | 399 | 393 |
| 9 | 410 | 414 | 408 |
| 10 | 402 | 408 | 400 |
| 11 | 400 | 404 | 397 |
| 12 | 398 | 404 | 396 |
| 13 | 393 | 398 | 390 |
| 14 | 398 | 405 | 397 |
| Control 5 | 465 | 468 | 465 |

TABLE 5-continued

| | Evaluation of catalytic property after aging in electric furnace | | |
|---|---|---|---|
| | Purifying property at low temperatures | | |
| Catalyst | CO purifying temperature, $T_{50}$ (°C.) | HC purifying temperature, $T_{50}$ (°C.) | NO purifying temperature, $T_{50}$ (°C.) |
| 6 | 450 | 455 | 449 |
| 7 | 446 | 450 | 445 |
| 8 | 462 | 465 | 462 |

Then, the catalysts of Examples 8 through 14 and the catalysts of Controls 5 through 8 were tested for catalytic activity after the endurance test in an engine.

This endurance test was performed by using a commercially available electronically controlled engine (8 cylinders 4,400 cc), with a multi-converter packed with a catalyst under test and connected to the exhaust system of the engine. The engine was operated in a mode of alternating 60 seconds' steady operation and 6 seconds' decelerated operation (during which period the supply of fuel was cut and the catalyst was exposed to harsh conditions of a high-temperature oxidative atmosphere), with the catalyst exposed to 50 hours' aging under conditions such that the inlet gas temperature would reach 800° C. during the steady operation.

The evaluation of the catalytic property after the enduracne test in the engine was carried out in entirely the same manner as in the evaluation of the catalytic property after the aging in the electoric furnace described above. The data consequently obtained were compared with those of the purifying property at low temperatures. The results are shown in Table 6 below.

TABLE 6

| | Evaluation of catalytic property after test run of engine | | |
|---|---|---|---|
| | Purifying property at low temperatures | | |
| Catalyst | CO purifying temperature, $T_{50}$ (°C.) | HC purifying temperature, $T_{50}$ (°C.) | NO purifying temperature, $T_{50}$ (°C.) |
| Example 8 | 375 | 380 | 369 |
| 9 | 388 | 394 | 380 |
| 10 | 385 | 392 | 376 |
| 11 | 379 | 385 | 370 |
| 12 | 377 | 385 | 369 |
| 13 | 373 | 380 | 365 |
| 14 | 378 | 386 | 370 |
| Control 5 | 440 | 447 | 436 |
| 6 | 430 | 436 | 425 |
| 7 | 425 | 430 | 420 |
| 8 | 440 | 446 | 436 |

It is clearly noted from Tables 5 and 6 that the catalysts of Examples 8 through 14 in which refractory inorganic oxides having platinum and/or rhodium deposited in high ratios as contemplated by the present invention were dispersed in the form of particles possesing an average particle diameter in the range of 0.5 to 20 microns invariably exhibied better catalytic properties than the catalysts of Control 5 which had noble metals dispersed in the conventional state. The catalyst of Control 6 which had platinum deposited in a ratio of not less than 30% by weight and rhodium in a ratio of not less than 20% by weight, the catalyst of Control 7 which had platinum and rhodium deposited in ratios falling in the range specified by the present invention and but had these noble metals dispersed in the form of particles exceeding 30 microns in diameter, and the catalyst of Control 8 which had no platinum deposited on a refractory inorganic oxide invariably exhibited poor catalytic properties.

From the foregoing results, it is clear that the catalysts having platinum and rhodium deposited and dispersed under the conditions contemplated by the present invention incur only slight deterioration and exhibit highly satisfactory durability not only under the ordinary conditions of engine operation but also udner harsh conditions as in a high-temperature oxidative atmosphere.

EXAMPLE 16

A finished catalyst was obtained by following the procedure of Example 8, excepting 75 g of a commercially available cerium oxide powder (produced by Nissan Kigenso K.K.) was incorporated in addition to 139 g of the activated alumina, the platinum-containing alumina powder, and the rhodium-containing alumina powder.

When the coating layer of this catalyst was examined by the same method as used in Example 8, the platinum-containing alumina and the rhodium-containing alumina were found to be dispersed in the form of particles possessing an average particle diameter of 5 microns. This catalyst was found to contain 100 g of alumina, 1.0 g of platinum, and 0.2 g of rhodium per liter of the catalyst.

EXAMPLE 17

An alumina powder containing 0.2% by weight rhodium was prepared by mixing an aqueous rhodium nitrate solution containing 0.3 g of rhodium with 142 g of an activated aluminum possessing a specific surface area of 120 m$^2$/g, drying the resultant mixture, and then calcining the dried mixture in the air at 400° C. for 2 hours.

A finished catalyst was obtained by following the procedure of Example 16, excepting the rhodium-containing alumina powder was used in the place of the alumina powder containing 9% by weight of rhodium plus the activated alumina used in Example 16.

When the coating layer of this catalyst was examined by the same method as in Example 8, the platinum-containing alumina was found to be dispersed in the form of particles possessing an average particle diameter of 6 microns and no rhodium was found to be dispersed in the form of particles exceeding 0.5 microns in diameter. This catalyst was found to contain 100 g of alumina, 50 g of cerium oxide, 1.0 g of platinum, and 0.2 g of rhodium per liter of the catalyst.

EXAMPLE 18

An alumina powder containing 1% by weight of platinum was prepared by mixing an aqueous solution of the nitrate of dinitro-diammine platinum containing 1.5 g of platinum with 147 g of an activated alumina possessing a specific surface area of 120 m$^2$/g, drying the resultant mixture, and then calcining the dried mixture in the air at 400° C. for 2 hours.

A finished catalyt was obtained by following the procedure of Example 16, excepting the platinum-containing alumina powder was used in the place of the alumina powder containing 16.7% by weight of platinum and the activated alumina used in Example 16.

When the coating layer of this catalyts was examined by the same method as in Example 8, the rhodium-containing alumina was found to be dispersed in the form of particles possessing an average particle diameter of 4.5 microns and no platinum was found to be dispersed in the form of particles exceeding 0.5 micron in diameter. This catalyst was found to contain 100 g of alumina, 50 g of cerium oxide, 1.0 g of platinum, and 0.2 g of rhodium per liter of the catalyst.

EXAMPLE 19

A finished catalyst was obtained by following the procedure of Example 16, excepting an aqueous platinic chloride solution was used in the place of the aqueous solution of the nitrate of dinitro-diammine platinum. The platinum-containing alumina used in this case had 16.6% by weight of platinum deposited thereon.

When the coating layer of this catalyst was examined by the same method as in Example 8, the platinum-containing alumina was found to be dispersed in the form of particles possessing an average particle diameter of 7 microns and the rhodium-containing alumina in the form of particles possessing an average particle diameter of 4 microns. This catalyst was found to contain 100 g of alumina, 50 g of cerium oxide, 1.0 g of platinum, and 0.2 g of rhodium per liter of the catalyst.

EXAMPLE 20

A finished catalyst was obtained by following the procedure of Example 16, excepting an aqueous rhodium chloride was used in the place of the aqueous rhodium nitrate. The rhodium-containing alumina used in this case had 9.1% by weight of rhodium deposited thereon.

When the coating layer of this catalyst was examined by the same method as in Example 8, the platinum-containing alumina was found to be dispersed in the form of particles possessing an average particle diameter of 5 microns and the rhodium-containing alumina in the form of particles possessing an average particle diameter of 8 microns. This catalyst was found to contain 100 g of alumina, 50 g of cerium oxide, 0.1 g of platinum, and 0.2 g of rhodium per liter of the catalyst.

EXAMPLE 21

An alumina-modified cerium oxide (atomic ratio of Ce/Al=5) was prepared by thoroughly mixing 150 ml of an aqueous solution having dissolved therein 65.3 g of aluminum nitrate [Al(NO$_3$)$_3$·9H$_2$O] with 319 g of cerium carbonate powder (possessing a Ce content of 47% by weight as CeO$_2$), drying the resultant mixture at 130° C. for 5 hours, and then calcining the dried mixture in the air at 500° C. for 1 hour.

A finished catalyst was obtained by following the procedure of Example 16, excepting 75 g of the alumina-modified cerium oxide was used in the place of the commerically available cerium oxide powder.

When the coating layer of this catalyst was examined by the same method as in Example 8, the platinum-containing aluminum and the rhodium-containing alumina were both found to be dispersed in the form of particles possessing an average particle diameter of 6 microns. This catalyst was found to contain 100 g of alumina, alumina-modified cerium oxide (atomic ratio of Ce-/Al=5), 1.0 g of platinum, and 0.2 g of rhodium.

EXAMPLE 22

An alumina-modified cerium oxide (atomic ratio of Ce/Al=8) was prepared by thoroughly mixing 220 ml of an aqueous solution having dissolved therein 54.4 g of aluminum nitrate [Al(NO$_3$)$_3$ 9H$_2$O] with 426 g of cerium carbonate powder (possessing a Ce content of 47% by weight as CeO$_2$), drying the resultant mixture at 130° C. for 5 hours, and then calcining the dried mixture in the air at 500° C. for 1 hour.

A finished catalyst was obtained by following the procedure of Example 16, excepting 75 g of the alumina-modified cerium oxide was used in the place of the commercially available cerium oxide powder.

When the coating layer of this catalyst was examined by the same method as in Example 8, the platinum-containing alumina and the rhodium-containing alumina were both found to be dispersed in the form of particles possessing an average particle diameter of 6 microns. This catalyst was found to contain 100 g of alumina, 50 g of alumina-modified cerium oxide (atomic ratio of Ce/Al=8), 1.0 g of platinum, and 0.2g of rhodium per liter of the catalyst.

EXAMPLE 23

An alumina-modified cerium oxide (atomic ratio of Ce/Al=5) was prepared by mixing 94.7 g of alumina sol (containing 10% by weight as alumina ), 340 g of cerium carbonate (possessing a Ce content of 47% by weight as CeO$_2$), and 100 ml of water, drying the resultant mixture at 130° C. for 5 hours, and then calcining the dried mixture in the air at 500° C. for 1 hour.

A finished catalyst was obtained by following the procedure of Example 16, excepting 75 of the alumina-modified cerium oxide was used in the place of the commercially available cerium oxide powder.

When the coating layer of this catalyst was examined by the same method as in Example 8, the platinum-containing alumina and the rhodium-containing alumina were both found to be dispersed in the form of particles possessing an average particle diameter of 6 microns. This catalyst was found to contain 100 g of alumina, 50 g of alumina-modified cerium oxide (atomic ratio of Ce/Al=5), 1.0 g of platinum, and 0.2 of rhodium per liter of the catalyst.

EXAMPLE 24

A finished catalyst was obtained by following the procedure of Example 16, excepting the same metallic monolithic carrier as in Example 13 was used in the place of the monolithic carrier of cordierite.

When the coating layer of this catalyst was examined by the same method as in Example 8, the platinum-containing alumina was found to be dispersed in the form of particles possessing an average particle diameter of 4 microns and the rhodium-containing alumina in the form of particles possessing an average particle diameter of 3.5 microns. This catalyst was found to contain 100 g of alumina, 50 g of cerium oxide, 1.0 g of platinum, and 0.2 g of rhodium per liter of the catalyst.

EXAMPLE 25

An aqueous slurry was prepared by wet pulverizing 139 g of the same activated alumina as used in Example 16 with 75 g of commercialy availalbe cerium oxide in a ball mill for 13 hours. Further an aqueous slurry for coating was prepared by wet pulverizing the aqueous slurry and the alumina powder containing 16.7% by weight of platinum and the powder containing 9% by weight of rhodium prepared as in Example 16 in a ball mill for 7 hours. A finished catalyst was obtained by following the procedure of Example 16, using the aqueous slurry for coating.

When the coating layer of this catalyst was examined by the same method as in Example 8, the platinum-containing alumina was found to be dispersed in the form of particle possessing an average particle diameter of 15 microns and the rhodium-containing alumina in the form of particles possessing an average particle diameter of 10 microns. This catalyst was found to contain 100 g of alumina, 50 g of cerium oxide, 1.0 g of platinum, and 0.2 g of rhodium per liter of the catalyst.

CONTROL 9

A catalyst was obtained by following the procedure of Control 5, excepting 75 g of a commercially available cerium oxide powder was incorporated in addition to 150 g of the same activated alumina as used in Example 16.

When the coating layer of this catalyst was examined by the same method as in Example 8, neither platinum nor rhodium was found to be dispersed in the form of particles exceeding 0.5 micron in diameter. This catalyst was found to contain 100 g of alumina, 50 g of cerium oxide, 1.0 g of platinum, and 0.2 of rhodium per liter of the catalyst.

CONTROL 10

A finished catalyst was obtained by following the procedure of Control 6, excepting 75 g of cerium oxide was further incorporated during the course of mixture of the powder.

When the coating layer of this catalyst was examined by the same method as in Example 8, the platinum-containing alumina and the rhodium-containing alumina were both found to be dispersed in the form of particles possessing an average particle diamter of 8 microns. This catalyst was found to contain 100 g of alumina, 50 g of cerium oxide, 1.0 g of platinum, and 0.2 g of rhodium per liter of the catalyst.

CONTROL 1

A finished catalyst was obtained by following the procedure of Control 7, excepting 75 g of cerium oxide was further incorporated during the course of mixture of the powders.

When the coating layer of this catalyst was examined by the same method as in Example 8, the platinum-containing alumina was found to be dispersed in the form of particles possessing an average particle diameter of 30 microns and the rhodium-containing alumina in the form of particles possessing an average particle diamter of 40 microns. This catalyst was found to contain 100 g of alumina, 50 g of cerium oxide, 1.0 g of platinum, and 0.2 g of rhodium per liter of the catalyst.

CONTROL 12

A finished catalyst was obtained by following the procedure of Control 8, excepting 75 g of cerium oxide was further incorporated during the mixture of the powders.

When the coating layer of this catalyst was examined by the same method as in Example 8, platinum was found to be dispersed in the form of particles possessing an average particle diameter of 1 micron and no rhodium was found to be dispersed in the form of particles exceeding 0.5 micron in diameter. This catalyst was found to contain 100 g of alumina, 50 g of cerium oxide, 1.0 g of platinum, and 0.2 g of rhodium per liter of the catalyst.

EXAMPLE 26

The catalysts of Examples 16 through 25 and the catalyts of Controls 9 through 12 were tested for catalytic property after the aging in an electric furnace and for catalytic property after the endurance test in an engine by following the procedure of Example 15. The results are respectively shown in Table 7 and Table 8.

TABLE 7

| | Evaluation of catalytic property after aging in electric furnace | | | | |
|---|---|---|---|---|---|
| | Three way performance Crossover point | | Purifying property at low temperatures | | |
| | | | CO purifying | HC purifying | NO purifying |
| Catalyst | CO,NO purifying ratio (%) | HC purifying ratio (%) | temperature $T_{50}$ (°C.) | temperature $T_{50}$ (°C.) | temperature $T_{50}$ (°C.) |
| Example | | | | | |
| 16 | 88 | 87 | 386 | 390 | 385 |
| 17 | 80 | 81 | 403 | 407 | 400 |
| 18 | 83 | 83 | 395 | 400 | 392 |
| 19 | 87 | 86 | 388 | 393 | 386 |
| 20 | 89 | 88 | 385 | 388 | 383 |
| 21 | 94 | 96 | 370 | 375 | 366 |
| 22 | 93 | 94 | 373 | 377 | 370 |
| 23 | 91 | 94 | 375 | 379 | 373 |
| 24 | 89 | 89 | 382 | 385 | 380 |
| 25 | 86 | 86 | 390 | 395 | 388 |
| Control | | | | | |
| 9 | 51 | 60 | 443 | 447 | 441 |
| 10 | 63 | 68 | 427 | 430 | 426 |
| 11 | 65 | 72 | 420 | 425 | 418 |
| 12 | 49 | 58 | 445 | 449 | 444 |

TABLE 8

| | Evaluation of catalytic property after test run of engine | | | | |
|---|---|---|---|---|---|
| | Three way performance Crossover point | | Purifying property at low temperatures | | |
| | | | CO purifying | HC purifying | NO purifying |
| Catalyst | CO,NO purifying ratio (%) | HC purifying ratio (%) | temperature $T_{50}$ (°C.) | temperature $T_{50}$ (°C.) | temperature $T_{50}$ (°C.) |
| Example | | | | | |
| 16 | 87 | 93 | 356 | 360 | 350 |
| 17 | 80 | 90 | 365 | 370 | 360 |
| 18 | 83 | 92 | 361 | 365 | 355 |
| 19 | 86 | 93 | 358 | 363 | 351 |
| 20 | 87 | 93 | 357 | 363 | 352 |
| 21 | 94 | 98 | 340 | 345 | 334 |
| 22 | 92 | 97 | 342 | 346 | 335 |
| 23 | 93 | 97 | 344 | 349 | 339 |
| 24 | 89 | 94 | 353 | 358 | 347 |
| 25 | 85 | 91 | 360 | 364 | 354 |
| Control | | | | | |
| 9 | 73 | 83 | 393 | 401 | 390 |
| 10 | 75 | 85 | 393 | 400 | 389 |
| 11 | 77 | 86 | 382 | 390 | 376 |
| 12 | 70 | 81 | 395 | 403 | 390 |

It is clearly noted from Tables 7 and 8 that the catalysts of Examples 16 through 25 in which refractory inorganic oxides having platinum and/or rhodium deposited in high ratios as contemplated by the present invention were dispersed in the form of particles possessing an average particle diameter in the range of 0.5 to 20 microns invariably exhibited better catalytic property than the catalyst of Control 9 having the noble metals deposited and dispersed in the conventional states. The catalyst of Control 10 which had platinum deposited in a ratio of not less than 30% by weight and rhodium in a ratio of not less than 20% by weight, the catalyst of Control 11 which had platinum and rhodium deposited at ratios both falling within the ranges contemplated by this invention but dispersed in the form of particles exceeding 30 microns in diameter, and the catalyst of Control 12 which had no platinum deposited on a refractory inorganic oxide invariably exhibited poor properties.

The catalysts of Examples 21 through 23 which used alumina-modified cerium oxide as a cerium oxide exhibited still better properties.

EXAMPLE 27

An alumina powder containing 16.1% by weight of platinum and 3.2% by weight of rhodium was prepared by mixing 7.5 g of an activated alumina possessing a specific surface area of 100 $m^2/g$ with a mixture of an aqueous solution of the nitrate of dinitro-ammine platinum containing 1.5 g of platinum and an aqueous rhodium nitrate solution containing 0.3 g of rhodium, thoroughly drying the resultant mixture, and then calcining the dried mixture in the air at 400° C. for 2 hours.

An aqueous slurry for coating was prepared by wet pulverizing 139 g of the same activated alumina as described above and the platinum and rhodium-containing alumina powder in a ball mill for 20 hours. The same monolithic carrier as used in Example 8 was immersed in this aqueous slurry for coating, removed from the slurry, and then blown with compressed air to remove excess slurry from within the cells and relieve all the cells of clogging slurry. Then, the wet carrier was calcined at 130° C. for 3 hours, to obtain a finished catalyst.

When the coating layer of this catalyst was examined by the same method as in Example 8, the platinum- and rhodium-containing alumina was found to be dispersed in the form of particles possessing an average particle diameter of 4 microns. This catalyst was found to contain 100 g of alumina, 1.0 g of platinum, and 0.2 g of rhodium per liter of the catalyst.

CONTROL 13

An alumina powder containing 0.99% by weight of platinum and 0.2% by weight of rhodium was prepared by mixing 150 g of the same activated alumina as used in Example 27 with a mixture of an aqueous solution of the nitrate of dinitro-diammine platinum containing 1.5 g of platinum and an aqueous rhodium nitrate solution, thoroughly drying the resultant mixture, and then calcining the dried mixture in the air at 400° C. for 2 hours. A finished catalyst was obtained by following the procedure of Example 27, using the aforementioned alumina powder containing platinum and rhodium.

When the coating layer of this catalyst was examined by the same method as in Example 8, the platinum- and rhodium-containing alumina was not found to be dispersed in the form of particles exceeding 0.5 micron in diamter. This catalyst was found to contain 100 g of alumina, 1.0 g of platinum, and 0.2 g of rhodium per liter of the catalyst.

EXAMPLE 28

A finished catalyst was obtained by following the procedure of Example 27, excepting an aqueous platinic chloride solution was used in the place of the aqueous solution of the nitrate of dinitro-diammine platinum. The platinum- and rhodium-containing alumina had 16.4% by weight of platinum and 3.1% by weight of rhodium deposited thereon.

When the coating layer of this catalyst was examined by the same method as in Example 8, the platinum- and rhodium-containing alumina was found to be dispersed in the form of particles possessing an average particle diameter of 7 microns. This catalyst was found to contain 100 g of alumina, 1.0 g of platinum, and 0.2 g of rhodium per liter of the catalyst.

EXAMPLE 29

A finished catalyst was obtained by following the procedure of Example 27, excepting an aqueous rhodium chloride solution was used in the palce of the aqueous rhodium nitrate solution. The platinum- and rhodium-containing alumina used in this had 16.1% by weight of platinum and 3.3% by weight of rhodium deposited thereon.

When the coating layer of this catalyst was examined by the same method as in Example 8, the platinum- and rhodium-containing alumina was found to be dispersed in the form of particles possessing an average particle diameter of 5 microns. This catalyst was found to contain 100 g of alumina, 1.0 g of platinum, and 0.2 g of rhodium per liter of the catalyst.

EXAMPLE 30

An alumina powder containing 11.4% by weight of platinum and 3.4% by weight of rhodium was prepared by mixing 7.5 g of an activated alumina possessing a specific surface area of 120 $m^2/g$ with a mixture of an aqueous solution the nitrate of dinitro-diammine platinum containing 1.0 g of platinum and an aqueous rhodium nitrate solution containing 0.3g of rhodium, thoroughly drying the resultant mixture, and then calcining the dried mixture in the air at 400° C. for 2 hours.

A finished catalyst was obtained by following the procedure of Exmaple 27, excepting the platinum- and rhodium-containing alumina was used in the place of the alumina powder containing 16.1% by weight of platinum and 3.2% by weight of rhodium.

When the coating layer of this catalyst was examined by EPMA, the platinum- and rhodium-containing alumina was found to be dispersed in the form of particles possessing an average particle diamter of 5 microns. This catalyst was found to contain 100 g of alumina, 0.67 g of platinum, and 0.2 g of rhodium per liter of the catalyst.

EXAMPLE 31

A finished catalyst was obtained by following the procedure of Example 27, excepting the same metallic monolithic carrier as used in Example 13 was used in the place of the monolithic carrier of cordierite. The platinum- and rhodium-containing alumina used in this case contained 16.3% by weight of platinum and 3.2% by weight of rhodium.

When the coating layer of this catalyst was examined by the same method as in Example 8, the platinum- and rhodium-containing alumina was found to be dispersed in the form of particles possessing an average particle diameter of 4 microns. This catalyst was found to contain 100 g of alumina, 1.0 g of platinum, and 0.2 g of rhodium per liter of the catalyst.

EXAMPLE 32

An aqueous slurry was prepared by wet pulverizing 139 g of the same activated alumina as used in Example 27 in a ball mill for 13 hours. An aqueous slurry for coating was prepared by wet pulverizing the aqueous slurry and the same alumina powder containing 16.1% by weight of platinum and 3.2% by weight of rhodium as in Example 27 in a ball mill for 7 hours. A finished catalyst was obtained by following the procedure of Example 27, using the aqueous slurry for coating.

When the coating layer of the catalyst was examined by the same method as in Example 8, the platinum- and rhodium-containing alumina was found to be dispersed in the form of particles possessing an average particle diameter of 15 microns. This catalyst was found to contain 100 g of alumina, 1.0 g of platinum, and 0.2 of rhodium per liter of the catalyst.

EXAMPLE 33

The catalysts of Examples 27 through 32 and the catalyst of Control 13 were tested for catalytic property after aging in an electric furnace and for catalytic activity after endurance test in an engine in the same manner as in Example 15. The results are shown respectively in Table 9 and Table 10.

TABLE 9

| | Evaluation of catalytic property after aging in electric furnace | | |
|---|---|---|---|
| | Purifying property at low temperatures | | |
| Catalyst | Co purifying temperature, $T_{50}$ (°C.) | HC purifying temperature, $T_{50}$ (°C.) | NO purifying temperature, $T_{50}$ (°C.) |
| Example 27 | 385 | 390 | 382 |
| 28 | 390 | 394 | 388 |
| 29 | 388 | 392 | 385 |
| 30 | 395 | 399 | 392 |
| 31 | 386 | 390 | 382 |
| 32 | 393 | 397 | 390 |
| Control 13 | 465 | 468 | 465 |

TABLE 10

| | Evaluation of catalytic property after aging in electric furnace | | |
|---|---|---|---|
| | Purifying property at low temperatures | | |
| Catalyst | CO purifying temperature, $T_{50}$ (°C.) | HC purifying temperature, $T_{50}$ (°C.) | NO purifying temperature, $T_{50}$ (°C.) |
| Example 27 | 364 | 370 | 359 |
| 28 | 369 | 375 | 364 |
| 29 | 367 | 374 | 361 |
| 30 | 375 | 382 | 370 |
| 31 | 363 | 369 | 357 |
| 32 | 373 | 380 | 368 |
| Control 13 | 440 | 447 | 436 |

It is clearly noted from Table 9 and Table 10 that the catalysts of Examples 27 through 32 in which refractory inorganic oxides having platinum and rhodium deposited in high ratios contemplated by this invention were dispersed in the form of particles possessing an average particle diameter in the range of 0.5 to 20 microns exhibited far better catalytic properties than the catalyst of Control 13 having noble metals deposited in the conventional state.

EXAMPLE 34

A finished catalyst was obtained by following the procedure of Example 27, excepting 75 g of a commercially available cerium oxide powder (produced by Nissan Kigenso K.K.) was additionally used with 139 g of the activated alumina and the platinum- and rhodium-containing alumina powder.

When the coating layer of this catalyst was examined by the same method as in Example 8, the platinum- and rhodium-containing alumina was found to be dispersed in the form of particles possessing an average particle diameter of 4 microns. This catalyst was found to contain 100 g of alumina, 50 g of cerium oxide, 1.0 g of platinum, and 0.2 g of rhodium per liter of the catalyst.

CONTROL 14

A finished catalyst was obtained by following the procedure of Example 34, excepting 75 g of the same commercially available cerium oxide powder as used in Example 34 was used in addition to the platinum- and rhodium-containing alumina powder obtained as in Control 13.

When the coating layer of this catalyst was examined by the same method as in Example 8, neither platinum nor rhodium was found to be dispersed in the form of particles exceeding 0.5 micron in diameter. This catalyst was found to contain 100 g of alumina, 50 g of cerium oxide, 1.0 g of platinum, and 0.2 g of rhodium per liter of the catalyst.

EXAMPLE 35

A finished catalyst was obtained by following the procedure of Example 34, excepting an aqueous platinic chloride solution was used in the place of the aqueous solution of the nitrate of dinitro-diammine platinum. The platinum- and rhodium-containing alumina used in this case contained 16.0% by weight of platinum and 3.3% by weight of rhodium.

When the coating layer of this catalyst was examined by the same method as in Example 8, the platinum- and rhodium-containing alumina was found be dispersed in the form of particles possessing an average particle diameter of 7 microns. This catalyst was found to contain 100 g of alumina, 50 g of cerium oxide, 1.0 g of platinum, and 0.2 g of rhodium per liter of the catalyst.

EXAMPLE 36

A finished catalyst was obtained by following the procedure of Example 34, excepting an aqueous rhodium chloride solution was used in the place of the aqueous rhodium nitrate solution. The platinum- and rhodium-containing alumina used in this case contained 16.1% by weight of platinum and 3.1% by weight of rhodium.

When the coating layer of this catalyst was examined by the same method as in Example 8, the platinum- and rhodium-containing alumina was found to be dispersed in the form of particles possessing an average particle diameter of 5 microns. This catalyst was found to contain 100 g of alumina, 50 g of cerium oxide, 1.0 g of platinum, and 0.2 g of rhodium per liter of the catalyst.

EXAMPLE 37

A finished catalyst was obtained by following the procedure of Example 34, excepting the same platinum- and rhodium-containing alumina as obtained in Example 30 was used in the place of the rhodium-containing alumina powder containing 16.1% by weight of platinum and 3.2% by weight of rhodium.

When the coating layer of this catalyst was examined by the same method as in Example 8, the platinum- and rhodium-containing alumina was found to be dispersed in the form of particles possessing an average particle diameter of 5 microns. This catalyst was found to contain 100 g of alumina, 50 g of cerium oxide, 0.67 g of platinum, and 0.2 g of rhodium per liter of the catalyst.

EXAMPLE 38

A finished catalyst was obtained by following the procedure of Example 34, excepting the same metallic monolithic carrier as in Example 13 was used in the place of the monolithic carrier of cordierite.

When the coating layer of this catalyst was examined by the same method as in Example 8, the platinum- and rhodium-containing alumina was found to be dispersed in the form of particles possessing an average particle diameter of 4 microns. This catalyst was found to contain 100 g of alumina, 50 g of cerium oxide, 1.0 g of platinum, and 0.2 g of rhodium per liter of the catalyst.

EXAMPLE 39

A finished catalyst was obtained by following the procedure of Example 34, excepting 75 g of the same alumina-modified cerium oxide as in Example 21 was used in the place of the commercially available cerium oxide powder.

When the coating layer of this catalyst was examined by the same method as in Example 8, the platinum- and rhodium-containing alumina was found to be dispersed in the form of particles possessing an average particle diameter of 6 microns. This catalyst was found to contain 100 g of alumina, 50 g of alumina-modified cerium oxide (atomic ratio of Ce/Al=5), 1.0 g of platinum, and 0.2 g of rhodium per liter of the catalyst.

EXAMPLE 40

A finished catalyst was obtained by following the procedure of Example 34, excepting 75 g of the same alumina-modified cerium oxide as in Example 22 was used in the place of the commercially available cerium oxide powder.

When the coating layer of this catalyst was examined by the same method as in Example 8, the platinum- and rhodium-containing alumina was found to be dispersed in the form of particles possessing an average particle diameter of 6 microns. This catalyst was found to contain 100 g of alumina, 50 g of alumina-modified cerium oxide (atomic ratio of Ce/Al=8), 1.0 g of platinum, and 0.2 g of rhodium per liter of the catalyst.

EXAMPLE 41

A finished catalyst was obtained by following the procedure of Example 34, excepting 75 g of the same alumina-modified cerium oxide as in Example 23 was used in the place of the commercially available cerium oxide powder.

When the coating layer of this catalyst was examined by the same method as in Example 8, the platinum- and rhodium-containing alumina was found to be dispersed in the form of particles possessing an average particle diameter of 6 microns. This catalyst was found to contain 100 g of alumina, 50 g of alumina-modified cerium oxide (atomic ratio of Ce/Al=5), 1.0 g of platinum, and 0.2 g of rhodium per liter of the catalyst.

EXAMPLE 42

An aqueous slurry was prepared by wet pulverizing 139 g of the same activated alumina as used in Example 34 and 75 g of a commercially available cerium oxide in a ball mill for 13 hours. An aqueous slurry for coating was prepared by wet pulverizing the aqueous slurry and the alumina powder containing 16.1% by weight of platinum and 3.2% by weight of rhodium as prepared in Example 34 in a ball mill for 7 hours. A finished catalyst was obtained by following the procedure of Example 34, using the aforementioned aqueous slurry for coating.

When the coating layer of this catalyst was examined by the same method as in Example 8, the platinum- and rhodium-containing alumina was found to be dispersed in the form of particles possessing an average particle diameter of 15 microns. This catalyst was found to contain 100 g of alumina, 50 g of cerium oxide, 1.0 g of platinum, and 0.2 g of rhodium per liter of the catalyst.

EXAMPLE 43

The catalysts of Examples 34 through 42 and the catalyst of Control 14 were tested for catalytic property after aging in an electric furnace and for catalytic activity after endurance test in an engine in the same manner as in Example 15. The results are shown in Table 11 and Table 12.

TABLE 11

Evaluation of catalytic property after aging in electric furnace

| | Three way performance Crossover point | | Purifying property at low temperatures | | |
|---|---|---|---|---|---|
| Catalyst | CO,NO purifying ratio (%) | HC purifying ratio (%) | CO purifying temperature $T_{50}$ (°C.) | HC purifying temperature $T_{50}$ (°C.) | NO purifying temperature $T_{50}$ (°C.) |
| Example | | | | | |
| 34 | 90 | 91 | 380 | 385 | 377 |
| 35 | 88 | 88 | 384 | 390 | 381 |
| 36 | 89 | 90 | 382 | 388 | 378 |
| 37 | 85 | 86 | 390 | 396 | 388 |
| 38 | 91 | 92 | 379 | 385 | 376 |
| 39 | 94 | 96 | 370 | 375 | 367 |
| 40 | 92 | 93 | 373 | 378 | 370 |
| 41 | 92 | 93 | 372 | 376 | 368 |
| 42 | 87 | 88 | 390 | 395 | 387 |
| Control | | | | | |
| 14 | 51 | 60 | 443 | 447 | 441 |

TABLE 12

Evaluation of catalytic property after test run of engine

| | Three way performance Crossover point | | Purifying property at low temperatures | | |
|---|---|---|---|---|---|
| Catalyst | CO,NO purifying ratio (%) | HC purifying ratio (%) | CO purifying temperature $T_{50}$ (°C.) | HC purifying temperature $T_{50}$ (°C.) | NO purifying temperature $T_{50}$ (°C.) |
| Example | | | | | |
| 34 | 90 | 95 | 348 | 353 | 341 |
| 35 | 87 | 93 | 354 | 360 | 348 |
| 36 | 88 | 93 | 352 | 358 | 345 |
| 37 | 85 | 90 | 360 | 366 | 354 |
| 38 | 91 | 96 | 347 | 353 | 340 |
| 39 | 95 | 97 | 340 | 345 | 334 |
| 40 | 93 | 96 | 342 | 348 | 336 |
| 41 | 93 | 96 | 342 | 347 | 335 |
| 42 | 86 | 92 | 358 | 362 | 351 |
| Control | | | | | |
| 14 | 73 | 83 | 393 | 401 | 390 |

It is clearly noted from Table 11 and Table 12 that the catalysts of Examples 34 through 42 in which refractory inorganic oxides having platinum and rhodium deposited in high ratios as contemplated by the present invention were dispersed in the form of particles possessing an average particle diameter in the range of 0.5 to 20 microns invariably exhibited better properties than the catalyst of Control 14 having noble metals deposited in the conventional state. Particularly the catalysts of Example 36 through 41 which used alumina-modified oxides as cerium oxide exhibited notable satisfactory properties.

EXAMPLE 44

A zirconia powder containing 16.7% by weight of platinum was prepared by mixing an aqueous solution of the nitrate of dinitro-diammine platinum containing 1.5 g of platinum with 7.5 g of zirconia possessing a specific surface area of 60 m²/g and an average particle diameter of 200 Å (produced by Daiichi Kigenso Kagaku K.K.), drying the resultant mixture overnight at 120° C., and then calcining the dried mixture in the air at 400° C. for 2 hours.

A zirconia powder containing 9% by weight of rhodium was prepared by mixing an aqueous rhodium nitrate solution containing 0.3 g of rhodium and 3 g of the same zirconia as mentioned above, drying the resultant mixture overnight at 120° C., and then calcining the dried mixture in the air at 400° C. for 2 hours.

An aqueous slurry for coating was prepared by severally pulverizing the platinum-containing zirconia powder and rhodium-containing zirconia powder in a mortar until an average particle diameter of about 20 microns, mixing the pulverized powders with 130 g of an activated alumina possessing a specific surface area of 100 m²/g, and wet pulverizing the resultant mixture in a ball mill for 20 hours.

A finished catalyst was obtained by immersing the same monolithic carrier as used in Example 8 in the coating aqueous slurry, removing the carrier from the slurry, blowing the wet carrier with compressed air so as to relieve all the cells in the carrier of clogging slurry, and then drying the carrier at 130° C. for 3 hours.

When the coating layer of this catalyst was examined by the same method as in Example 8, the platinum-containing zirconia and the rhodium-containing zirconia were found to be dispersed both in the form of particles possessing an equal average particle diameter of 7 microns. This catalyst was found to contain 0.065 g of platinum and 0.013 g of rhodium per carrier piece.

EXAMPLE 45

A zirconia powder containing 16.7% by weight of palladium was prepared by mixing an aqueous palladium nitrate solution containing 1.5g of palladium with 7.5 g of the same zirconia as used in Example 44, drying the resultant mixture overnight at 120° C., and then calcining the dried mixture in the air at 400° C. for 2 hours.

A finished catalyst was obtained by following the procedure of Example 44, excepting the palladium-containing zirconia powder was used in the place of the platinum-containing zirconia powder.

When the coating layer of this catalyst was examined by the same method as in Example 8, the palladium-containing zirconia was found to be dispersed in the form of particles possessing an average particle diameter of 5 microns and the rhodium-containing zirconia in the form of particles possessing an average particle diameter of 6 microns. This catalyst was found to contain 0.065 g of palladium and 0.013 g of rhodium per carrier piece.

EXAMPLE 46

A zirconia powder containing 5% by weight of palladium was prepared by mixing 7.5 g of the same zirconia as used in Example 44 with a mixture of an aqueous platinic chloride solution containing 0.9 g of platinum and an aqueous palladium chloride solution containing 0.6 g of palladium, drying the resultant mixture overnight at 120° C., and then calcining the dried mixture in the air at 400° C. for 2 hours.

A finished catalyst was obtained by following the procedure of Example 44, excepting the platinum- and palladium-containing zirconia powder was used in the place of the platinum-containing zirconia powder.

When the coating layer of the catalyst was examined by the same method as in Example 8, the platinum- and palladium-containing zirconia was found to be dispersed in the form of particles possessing an average particle diameter of 13 microns and the rhodium-containing zirconia in the form of particles possessing an average particle diameter of 5 microns. This catalyst was found to contain 0.039 g of platinum, 0.026 g of palladium, and 0.013 g of rhodium per carrier piece.

EXAMPLE 47

A finished catalyst was obtained by followig the procedure of Example 44, excepting a zirconia possessing a specific surface area of 90 m²/g and an average particle diameter of 150 Å (produced by Daiichi Kigenso Kagaku K.K.) was used in the place of the zirconia of Example 44.

When the coating layer of this catalyst was examined by the same method as in Example 8, the platinum-containing zirconia was found to be dispersed in the form of particles possessing an average particle diameter of 2 microns and the rhodium-containing zirconia in the form of particles possessing an average particle diameter of 6 microns. This catalyst was found to contain 0.065 g platinum and 0.013 g of rhodium per carrier piece.

EXAMPLE 48

A finished catalyst was obtained by following the procedure of Example 44, excepting the same metallic monolithic carrier as used in Example 13 was used in the place of the monolithic carrier of cordierite of Example 44.

When the coating layer of this catalyst was examined by the same method as in Example 8, the platinum-containing zirconia was found to be dispersed in the form of particles possessing an average particle diameter of 6 microns and the rhodium-containing zirconia in the form of particles possessing an average particle diameter of 7 microns. This catalyst was found to contain 0.065 g of platinum and 0.013 g of rhodium per carrier piece.

EXAMPLE 49

An alumina powder containing $CeO_2$ and $Fe_2O_3$ was obtained by dissolving 25.2 g of cerium nitate [Ce($NO_3$)$_3$·6$H_2O$] and 10.1 g of ferric nitrate [Fe($NO_3$)$_3$·9$H_2O$] in 100 g of purified water, mixing the resultant aqueous solution with 127 g of an activated alumina possessing a specific surface area of 100 m²/g, drying the resultant mixture overnight at 120° C., and then calcining the dried mixture in the air at 700° C. for 1 hour.

A finished catalyst was obtained by following the procedure of Example 44, excepting the CeO$_2$- and Fe$_2$O$_3$-containing alumina was used in the place of 139 g of the activated alumina of Example 44.

When the coating layer of this catalyst was examined by the same method as in Example 8, the platinum-containing zirconia and the rhodium-containing zirconia were found to be dispersed in the form of particles possessing an equal average particle diameter of 5 microns. This catalyst was found to contain 0.065 g of platinum and 0.013 of rhodium per carrier piece

CONTROL 15

An aqueous slurry for coating was prepared by wet pulverizing 150 g of the same activated alumina possessing a specific surface area of 100 m$^2$/g as in Example 44.

A finished catalyst was obtained by coating the same monolithic carrier of cordierite as in Example 44 with 6.5 g as alumina of the aqueous slurry for coating, immersing the carrier coated with the activated alumina in a mixture of an aqueous solution of the nitrate of dinitrodiammine platinum, and an aqueous solution of rhodium nitrate, removing the carrier from the solution, blowing the wet carrier with compressed air to remove excess aqueous solution, drying the wet carrier at 130° C. for 3 hours, and calcining the dried carrier in the air at 400° C. for 2 hours.

When the coating layer of this catalyst was examined by the same method as in Example 8, neither platinum nor rhodium was found to be dispersed in the form of particles exceeding 0.5 micron in diameter. This catalyst was found to contain 0.065 g of platinum and 0.013 g of rhodium per carrier piece.

CONTROL 16

An aqueous slurry for coating was prepared by wet pulverizing 150 g of the same zirconia possessing a specific surface area of 60 m$^2$/g and an average particle diameter of 200 Å as in Example 44.

A finished catalyst was obtained by coating the same monolithic carrier of cordierite as in Example 44 with 6.5 g as zirconia of the aqueous slurry for coating and depositing platinum and rhodium on the carrier coated with zirconia by following the procedure of Control 15.

When the coating layer of this catalyst was examined by the same method as in Example 8, neither platinum nor rhodium was found to be dispersed in the form of particles exceeding 0.5 micron in diameter. This catalyst was found to contain 0.065 g of platinum and 0.013 g of rhodium per carrier piece.

EXAMPLE 50

When the coating layer of this catalyst was examined by the same method as in Example 8, neither platinum nor rhodium was found to be dispersed in the form of particles exceeding 0.5 micron in diamter. This catalyst was found to contain 0.065 g of platinum and 0.013 g of rhodium per carrier piece.

The catalysts of Examples 44 through 49 and the catalysts of Controls 15 and 16 were tested for catalytic property after aging in an electric furnace and for catalytic activity after endurance test in an engine in the same manner as in Example 15. The results are shown in Table 13 and Table 14.

TABLE 13

Evaluation of catalytic property after aging in electric furnace

Purifying property at low temperatures

| Catalyst | CO purifying temperature, $T_{50}$ (°C.) | HC purifying temperature, $T_{50}$ (°C.) | NO purifying temperature, $T_{50}$ (°C.) |
|---|---|---|---|
| Example 44 | 383 | 388 | 381 |
| 45 | 375 | 381 | 374 |
| 46 | 377 | 384 | 375 |
| 47 | 381 | 386 | 379 |
| 48 | 380 | 386 | 378 |
| 49 | 378 | 385 | 375 |
| Control 15 | 456 | 460 | 455 |
| 16 | 463 | 468 | 462 |

TABLE 14

Evaluation of catalytic property after test run of engine

Purifying property at low temperatures

| Catalyst | CO purifying temperature, $T_{50}$ (°C.) | HC purifying temperature, $T_{50}$ (°C.) | NO purifying temperature, $T_{50}$ (°C.) |
|---|---|---|---|
| Example 44 | 360 | 366 | 352 |
| 45 | 375 | 382 | 369 |
| 46 | 370 | 376 | 365 |
| 47 | 361 | 365 | 353 |
| 48 | 358 | 363 | 350 |
| 49 | 362 | 368 | 354 |
| Control 15 | 438 | 455 | 453 |
| 16 | 442 | 450 | 440 |

EXAMPLE 51

A finished catalyst was obtained by following the procedure of Example 44, excepting 75 g of a commercially available cerium oxide powder (produced by Nissan Kiogenso K.K.) was used in addition to the platinum-containing zirconia powder, rhodium-containing zirconia powder, and 139 g of the activated alumina of Example 44. When the coating layer of this catalyst was examined by the same method as in Example 8, the platinum-containing zirconia and the rhodium-containing zirconia were found to be dispersed both in the form of particles possessing an average particle diameter of 7 microns. This catalyst was found to contain 0.065 g of platinum and 0.013 g of rhodium per carrier piece.

EXAMPLE 52

A zirconia powder containing 16.7% by weight of palladium was prepared by mixing an aqueous palladium nitrate solution containing 1.5 g of palladium with 7.5 g of the same zirconia as used in Example 51, drying the resultant mixture overnight at 120° C., and then calcining the dried mixture in the air at 400° C. for 2 hours.

A finished catalyst was obtained by following the procedure of Example 51, excepting the palladium-containing zirconia powder was used in the place of the platinum-containing zirconia powder of Example 51. When the coating layer of this catalyst was examined by the same method as in Example 8, the palladium-containing zirconia was found to be dispersed in the form of particles possessing an average particle diameter of 5 microns and the rhodium-containing zirconia in the form of particles possessing an average particle diameter of 6 microns. This catalyst was found to contain 0.065 g of palladium and 0.013 g of rhodium per carrier piece.

EXAMPLE 53

A zirconia powder containing 10% by weight of platinum and 6.7% by weight of palladium was prepared by mixing 7.5 g of the same zirconia as used in Example 51 with a mixture of an aqueous platinic chloride solution containing 0.9 g of platinum and an aqueous palladium chloride solution containing 0.6 g of palladium, drying the resultant mixture overnight at 120° C., and then calcining the dried- mixture in the air at 400° C. for 2 hours.

A finished catalyst was obtained by following the procedure of Example 51, excepting the platinum- and palladium-containing zirconia powder was used in the place of platinum-containing zirconia powder of Example 51.

When the coating layer of this catalyst was examined by the same method as in Example 8, the platinum- and palladium-containing zirconia was found to be dispersed in the form of particles possessing an average particle diameter of 13 microns and the rhodium-containing zirconia in the form of particles possessing an average particle diameter of 5 microns. This catalyst was found to contain 0.039 g of platinum, 0.026 g of palladium, and 0.013 g of rhodium per catalyst piece.

EXAMPLE 54

A finished catalyst was obtained by following the procedure of Example 51, excepting a zirconia possessing a specific surface area of $90m^2/g$ and an average particle diameter of 150 Å (produced by Daiichi Kigenso Kagaku K.K.) was used in the place of zirconia of Example 51.

When the coating layer of this catalyst was examined by the same method as in Example 8. The platinum-containing zirconia was found to be dispersed in the form of particles possessing an average particle diameter of 0.5 micron and the rhodium-containing zirconia in the form of particles possessing an average particle diameter of 1 micron.

EXAMPLE 55

A finished catalyst was obtained by following the procedure of Example 51, excepting the same metallic monolithic carrier as used in Example 13 was used in the place of the monolithic carrier of cordierite of Example 51.

When the coating layer of this catalyst was examined by the same method as in Example 8, the platinum-containing zirconia was found to be dispersed in the form of particles possessing an average particle diameter of 6 microns and the rhodium-containing zirconia in the form of particles possessing an average particle diameter of 7 microns. This catalyst was found to contain 0.065 g of platinum and 0.013 g of rhodium per carrier piece.

EXAMPLE 56

An alumina powder containing $CeO_2$ and $Fe_2O_3$ was obtained by dissolving 25.2 g of cerium nitrate ($Ce(NO_3)_3 \cdot 6H_2O$) and 10.1 g of ferric nitrate ($Fe(NO_3)_3 \cdot 9H_2O$) in 100 g of purified water, mixing the resultant solution with 127 g of an activated alumina possessing a specific surface area of $100$ $m^2/g$, drying the resultant mixture overnight at 120° C., and then calcining the dried mixture in the air at 700° C. for 1 hour.

A finished catalyst was obtained by following the procedure of Example 51, excepting the alumina containing $CeO_2$ and $Fe_2O_3$ was used in the place of 139 g of the activated alumina of Example 51.

When the coating layer of this catalyst was examined by the same method as in Example 8, the platinum-containing zirconia and the rhodium-containing zirconia were found to be dispersed both in the form of particles possessing an average particle diameter of 5 microns. This catalyst was found to contain 0.065 g of platinum and 0.013 g of rhodium per carrier piece.

EXAMPLE 57

A finished catalyst was obtained by following the procedure of Example 51, excepting 75 g of the same alumina-modified cerium oxide as in Example 21 was used in the place of the commercially available cerium oxide powder of Example 51.

When the coating layer of this catalyst was examined by the same method as in Example 8, the same platinum-containing zirconia and the rhodium-containing zirconia were found to be dispersed both in the form of particles possessing an equal average particle diameter of 3 microns. This catalyst was found to contain 0.065 g of platinum and 0.013 g of rhodium per carrier piece.

EXAMPLE 58

A finished catalyst was obtained by following the procedure of Example 51, excepting 75 g of the same alumina-modified cerium oxide as in Example 22 was used in the place of the commercially available cerium oxide powder of Example 51.

When the coating layer of this catalyst was examined by the same method as in Example 8, the platinum-containing zirconia and the rhodium-containing zirconia were found to be dispersed both in the form of particles possessing an equal average particle diameter of 6 microns. This catalyst was found to contain 0.065 g of platinum and 0.013 g of rhodium per carrier piece.

EXAMPLE 59

A finished catalyst was obtained by following the procedure of Example 51, excepting 75 g of the same alumina-modified cerium oxide as in Example 23 was used in the place of the commercially available cerium oxide powder of Example 51.

When the coating layer of this catalyst was examined by the same method as in Example 8, the platinum-containing zirconia and the rhodium-containing zirconia were found to be dispersed both in the form of particles possessing an equal average particle diameter of 1 micron. This catalyst was found to contain 0.065 g of platinum and 0.013 g of rhodium per carrier piece.

CONTROL 17

An aqueous slurry for coating was prepared by wet pulverizing 150 g of the same activated alumina possessing a specific surface area of 100 $m^2/g$ as used in Example 51 and 75 g of a commercially available cerium oxide powder in a ball mill for 20 hours.

A finished catalyst was obtained by coating the same monolithic carrier of cordierite as obtained in Example 51 with the aqueous slurry for coating, immersing the carrier coated with the activated alumina and the cerium oxide in a mixture of an aqueous solution of the nitrate of dinitro-diammine platinum and an aqueous rhodium nitrate solution, removing the carrier from the mixture, blown with compressed air to remove excess solution, drying the wet carrier at 130° C. for 3 hours, and then calcining the dried carrier in the air at 400° C. for 2 hours.

When the coating layer of this catalyst was examined by the same method as in Example 8, neither platinum nor rhodium was found to be dispersed in the form of particles exceeding 0.5 micron. This catalyst was found to contain 0.065 g of platinum and 0.013 g of rhodium per carrier piece.

CONTROL 18

An aqueous slurry for coating was prepared by wet pulverizing 150 g of the same zirconia possessing a specific surface area of 60 m²/g and an average particle diameter of 200 Å and 75 g of a commercially available cerium oxide powder in a ball mill for 20 hours.

A finished catalyst was obtained by coating the same monolithic carrier of cordierite as used in Example 51 with the aqueous slurry for coating and depositing platinum and rhodium on the carrier coated with zirconia and cerium oxide by following the procedure of Control 17.

When the coating layer of this catalyst was examined by the same method as in Example 8, neither platinum nor rhodium was found to be dispersed in the form of particles exceeding 0.5 micron in diameter. This catalyst was found to contain 0.065 g of platinum and 0.013 g of rhodium.

EXAMPLE 60

The catalysts of Examples 51 through 59 and the catalysts of Controls 17 and 18 were tested for catalytic property after aging in an electric furnace and for catalytic activity after endurance test in an engine in the same manner as in Example 15. The results are shown in Tables 15 and 16.

TABLE 15

Evaluation of catalytic property after aging in electric furnace

| Catalyst | Three way performance Crossover point CO,NO purifying ratio (%) | Three way performance Crossover point HC purifying ratio (%) | Purifying property at low temperatures CO purifying temperature $T_{50}$ (°C.) | Purifying property at low temperatures HC purifying temperature $T_{50}$ (°C.) | Purifying property at low temperatures NO purifying temperature $T_{50}$ (°C.) |
|---|---|---|---|---|---|
| Example | | | | | |
| 51 | 88 | 89 | 380 | 385 | 377 |
| 52 | 90 | 91 | 374 | 380 | 370 |
| 53 | 88 | 90 | 378 | 384 | 375 |
| 54 | 87 | 89 | 381 | 385 | 376 |
| 55 | 88 | 90 | 377 | 381 | 374 |
| 56 | 86 | 88 | 385 | 390 | 382 |
| 57 | 93 | 94 | 367 | 372 | 365 |
| 58 | 92 | 93 | 369 | 373 | 365 |
| 59 | 91 | 93 | 370 | 375 | 367 |
| Control | | | | | |
| 17 | 61 | 66 | 445 | 449 | 443 |
| 18 | 58 | 63 | 450 | 455 | 448 |

TABLE 16

Evaluation of catalytic property after test run of engine

| Catalyst | Three way performance Crossover point CO,NO purifying ratio (%) | Three way performance Crossover point HC purifying ratio (%) | Purifying property at low temperatures CO purifying temperature $T_{50}$ (°C.) | Purifying property at low temperatures HC purifying temperature $T_{50}$ (°C.) | Purifying property at low temperatures NO purifying temperature $T_{50}$ (°C.) |
|---|---|---|---|---|---|
| Example | | | | | |
| 51 | 86 | 92 | 355 | 360 | 349 |
| 52 | 83 | 90 | 365 | 372 | 360 |
| 53 | 85 | 92 | 362 | 370 | 355 |
| 54 | 86 | 93 | 352 | 358 | 345 |
| 55 | 87 | 93 | 356 | 362 | 349 |
| 56 | 88 | 94 | 353 | 359 | 345 |
| 57 | 94 | 98 | 340 | 345 | 333 |
| 58 | 92 | 97 | 344 | 350 | 336 |
| 59 | 92 | 96 | 343 | 348 | 335 |
| Control | | | | | |
| 17 | 70 | 81 | 395 | 402 | 390 |
| 18 | 65 | 76 | 401 | 410 | 395 |

It is clearly noted from Tables 15 and 16 that the catalysts of Examples 51 through 59 in which zirconia powders having platinum, palladium, and rhodium deposited in high ratios contemplated by the present invention were dispersed in coating layers in the form of coherent particles possessing an average particle diameter in the range of 0.5 to 20 microns invariably exhibited better catalytic properties than the catalysts of Controls 17 and 18. The catalysts of Examples 57 through 59 which used alumina-modified cerium oxides exhibited still better properties.

EXAMPLE 61

A zirconia powder containing 16.1% by weight of platinum and 3.2% by weight of rhodium was prepared by mixing 7.5 g of a zirconia possessing a specific surface area of 60 m²/g and an average particle diameter of 200 Å (produced by Daiichi Kigenso Kagaku K.K.) with a mixture of an aqueous solution of the nitrate of dinitro-diammine platinum containing 1.5 g of platinum and an aqueous rhodium nitrate solution containing 0.3 g of rhodium, drying the resultant mixture overnight at 120° C., and then calcining the dried mixture in the air at 400° C. for 2 hours.

An aqueous slurry for coating was prepared by pulverizing the platinum- and rhodium-containing zirconia powder in a mortar until coherent particles possessing an average particle diameter of about 20 microns were formed, mixing the pulverized powder with 139 g of an activated alumina possessing a specific surface area of 100 m²/g, and wet pulverizing the resultant mixture in a ball mill for 20 hours.

A finished catalyst was obtained by immersing the same monolithic carrier as used in Example 8 in the aqueous slurry for coating, removing the carrier from the slurry, blowing the wet carrier with compressed air to relive all the cells of the carrier of clogging slurry, and drying the coated carrier at 130° C. for 3 hours.

When the coating layer of this catalyst was examined by the same method as in Example 8, the platinum- and rhodium-containing zirconia was found to be dispersed in the form of particles possessing an average particle diameter 7 microns. This catalyst was found to contain 0.065 g of platinum and 0.013 g of rhodium per carrier piece.

EXAMPLE 62

A zirconia powder containing 16.1% by weight of palladium and 3.2% by weight of rhodium was prepared by mixing 7.5 g of the same zirconia as used in Example 1 with a mixture of an aqueous palladium nitrate solution containing 1.5 g of palladium and an aqueous rhodium nitrate solution containing 0.3 g of rhodium, drying the resultant mixture overnight at 120° C., and then calcining the dried mixture in the air at 400° C. for 2 hours.

A finished catalyst was obtained by following the procedure of Example 61, excepting the palladium and rhodium-containing zirconia powder was used in the place of the platinum- and rhodium-containing zirconia powder of Example 61.

When the coating layer of this catalyst was examined by the same method as in Example 8, the platinum- and rhodium-containing zirconia was found to be dispersed in the form of particles possessing an average particle diameter of 3 microns. This catalyst was found to contain 0.065 g of palladium and 0.013 g of rhodium.

EXAMPLE 63

A zirconia powder containing 9.7% by weight of platinum, 6.5% by weight of palladium, and 3.2% by weight of rhodium was prepared by mixing 7.5 g of the same zirconia as used in Example 61 with a mixture of an aqueous platinic chloride solution containing 0.9 g of platinum, and aqueous palladium chloride solution containing 0.6 g of palladium, and an aqueous rhodium nitrate solution containing 0.3 g of rhodium, drying the resultant mixture overnight at 120° C., and then calcining the dried mixture in the air at 400° C. for 2 hours.

A finished catalyst was obtained by following the procedure of Example 61, excepting the platinum-, palladium-, and rhodium-containing zirconia powder were used in the place of platinum- and rhodium-containing zirconia of Example 61.

When the coating layer of this catalyst was examined by the same method as in Example 8, the platinum-, palladium-, and rhodium-containing zirconia was found to be dispersed in the form of particles possessing an average particle diameter of 13 microns. This catalyst was found to contain 0.093 g of platinum, 0.026 g of palladium, and 0.013 g of rhodium per carrier piece.

EXAMPLE 64

A finished catalyst was obtined by following the procedure of Example 61, excepting a zirconia possessing a specific surface area of 90 m$^2$/g and an average particle diameter of 150 Å (produced by Daiichi Kigenso Kagaku K.K.) was used in the place of the zirconia of Example 61.

When the coating layer of this catalyst was examined by the same method as in Example 8, the platinum- and rhodium-containing zirconia was found to be dispersed in the form of particles possessing an average particle diameter of 2 microns. This catalyst was found to contain 0.065 g of platinum and 0.013 g of rhodium per carrier piece.

EXAMPLE 65

A finished catalyst was obtained by following the procedure of Example 61, excepting the same metallic carrier as used in Example 13 was used in the place of the monolithic carrier of cordierite of Example 61.

When the coating layer of this catalyst was examined by the same method as in Example 8, the platinum- and rhodium-containing zirconia was found to be dispersed in the form of particles possessing an average particle diameter of 6 microns. This catalyst was found to contain 0.065 g of platinum and 0.013 g of rhodium per carrier piece.

EXAMPLE 66

An alumina powder containing $CeO_2$ and $Fe_2O_3$ was obtained by dissolving 25.2 g of cerium nitrate ($Ce(NO_3)_3 \cdot 6H_2O$) and 10.1 g of ferric nitrate ($Fe(NO_3)_3 \cdot 9H_2O$) in 100 g of purified water, mixing the resultant solution with 127 g of an activated alumina possessing a specific surface area of 100 m$^2$/g, drying the resultant mixture overnight at 120° C., and then calcining the dried mixture in the air at 700° C. for 1 hour.

A finished catalyst was obtained by following the procedure of Example 61, excepting the $CeO_2$- and $Fe_2O_3$-containing alumina was used in the place of 139 g of the activated alumina of Example 61.

When the coating layer of this catalyst was examined by the same method as in Example 8, the platinum- and rhodium-containing zirconia was found to be dispersed in the form of particles possessing an average particle diameter of 5 microns. This catalsyt was found to contain 0.065 g of platinum and 0.013 g of rhodium per carrier piece.

CONTROL 19

An aqueous slurry for coating was prepared by wet pulverizing 150 g of the same activated alumina possessing a specific surface area of 100 m$^2$/g as used in Example 61 in a ball mill for 20 hours.

A finished catalyst was obtained by coating the same monolithic carrier of cordierite with 6.5 g as alumina of the aqueous slurry for plating in the same manner as in Example 61, immersing the carrier coated with the activated alumina in a mixture of an aqueous solution of the nitrate of dinitro-diammine platinum and an aqueous rhodium nitrate solution, removing the carrier from the mixture, blowing the wet carrier with compressed air to remove excess aqueous solution, drying the wet carrier at 130° C. for 3 hours, and calcining the dried carrier in the air at 400° C. for 2 hours.

When the coating layer of this catalyst was examined by the same method as in Example 8, neither platinum nor rhodium was found to be dispersed in the form of particles exceeding 0.5 micron in diameter. This catalyt was found to contain 0.065 g of platinum and 0.013 g of rhodium per carrier piece.

CONTROL 20

An aqueous slurry for coating was prepared by wet pulverizing 150 g of the same zirconia possessing a specific surface area of 60 m$^2$/g and an average particle diameter of 200 Å as used in Example 61 in a ball mill for 2 hours.

A finished catalyst was obtained by coating a monolithic carrier of cordierite with 6.5 g as zirconia of the aqueous slurry for coating in the same manner as in Example 61 and depositing platinum and rhodium on the carrier coated with the zirconia in the same manner as in Control 19.

When the coating layer of this catalyst was examined by the same method as in Example 8, neither platinum nor rhodium was found to be dispersed in the form of particles exceeing 0.5 micron in diameter. This catalyst was found to contain 0.065 g of platinum and 0.013 g of rhodium per carrier piece.

EXAMPLE 67

The catalysts of Examples 61 through 66 and the catalysts of Controls 19 and 20 were tested for catalytic property after aging in an electric furnace and for catalytic activity after endurance test in an engine in the same manner as in Example 15. The results are shown in Table 17 and Table 18.

TABLE 17

| | Evaluation of catalytic property after aging in electric furnace | | |
|---|---|---|---|
| | Purifying property at low temperatures | | |
| Catalyst | CO purifying temperature, $T_{50}$ (°C.) | HC purifying temperature, $T_{50}$ (°C.) | NO purifying temperature, $T_{50}$ (°C.) |
| Example 61 | 375 | 381 | 372 |
| 62 | 370 | 376 | 368 |
| 63 | 372 | 378 | 370 |
| 64 | 374 | 380 | 372 |
| 65 | 373 | 379 | 372 |
| 66 | 376 | 382 | 372 |
| Control 19 | 456 | 460 | 455 |
| 20 | 463 | 468 | 462 |

TABLE 18

| | Evaluation of catalytic property after test run of engine | | |
|---|---|---|---|
| | Purifying property at low temperatures | | |
| Catalyst | CO purifying temperature, $T_{50}$ (°C.) | HC purifying temperature, $T_{50}$ (°C.) | NO purifying temperature, $T_{50}$ (°C.) |
| Example 61 | 354 | 360 | 347 |
| 62 | 365 | 372 | 359 |
| 63 | 363 | 370 | 356 |
| 64 | 355 | 360 | 347 |
| 65 | 352 | 358 | 344 |
| 66 | 355 | 361 | 347 |
| Control 19 | 438 | 445 | 435 |
| 20 | 442 | 450 | 440 |

It is clearly noted from Table 17 and Table 18 that the catalyst of Examples 61 through 66 in which zirconia powders having platinum, palladium, and rhodium deposited in high ratios contemplated by this invention disposed in the coating layers in the form of particles possessing an average particle diamter in the range of 0.1 to 20 microns invariably exhibited better catalystic properties than the catalysts of Controls 19 and 20 which had noble metals deposited in the conventional state.

EXAMPLE 68

A finished catalyst was obtained by following the procedure of Example 61 excepting 75 g of a commercially available cerium oxide (produced by Nissa Kidogenso K.K.) was used in addition to the platinum- and rhodium-containing zirconia powder and 139 g of the activated alumina of Example 61. When the coating layer of this catalyst was examined by the same method as in Example 8, the platinum and rhodium-containing zirconia was found to be dispersed in the form of particles possessing an average particle diameter of 7 microns. This catalyst was found to contain 0.065 g of platinum and 0.013 g of rhodium per carrier piece.

EXAMPLE 69

A zirconia powder containing 16.1% by weight of palladium and 3.2% by weight of rhodium was prepared by mixing 7.5 g of the same zirconia as used in Example 68 with a mixture of an aqueous palladium nitrate solution containing 1.5 g of palladium and an aqueous rhodium nitrate solution containing 0.3 g of rhodium, drying the resultant mixture overnight at 120° C., then calcining the dried mixture in the air at 400° C. for 2 hours.

A finished catalyst was obtained by following the procedure of Example 68, excepting the palladium- and rhodium-containing zirconia powder was used in the place of platinum- and rhodium-containing zirconia powder of Example 68.

When the coating layer of this catalyst was examined by the same method as in Example 8, the palladium- and rhodium-containing zirconia was found to be dispersed in the form of particles possessing an average particle diameter of 3 microns. This catalyst was found to contain 0.065 g of palladium and 0.013 g of rhodium per carrier piece.

EXAMPLE 70

A zirconia powder containing 9.7% by weight of platinum, 6.5% by weight of palladium, and 3.2% by weight of rhodium was prepared by mixing 7.5 g of the same zirconia as used in Example 68 with a mixture of an aqueous platinic chloride solution containing 0.9 g of platinum, an aqueous palladium chloride solution containing 0.6 g of palladium, and an aqueous rhodium nitrate solution containing 0.3 g of rhodium, drying the resultant mixture overnight at 120° C., and then calcining the dried mixture in the air at 400° C. for 2 hours.

A finished catalyst was obtained by following the procedure of Example 68, excepting the platinum-, palladium-, and rhodium-containing zirconia powder was used in the place of the platinum- and rhodium-containing zirconia powder of Example 68.

When the coating layer of this catalyst was examined by the same method as in Example 8, the platinum-, palladium, and rhodium-containing zirconia was found to be dispersed in the form of particles possessing an average particle diameter of 13 microns. This catalyst was found to contain 0.039 g of platinum, 0.026 g of palladium, and 0.013 g of rhodium per carrier piece.

EXAMPLE 71

A finished catalyst was obtained by following the procedure of Example 68, excepting a zirconia possessing a specific surface area of 90 m²/g and an average particle diamter of 150 Å (produced by Daiichi Kigenso Kagaku K.K.) was used in the place of the zirconia of Example 68.

When the coating layer of this catalyst was examined by the same method as in Example 8, the platinum- and rhodium-containing zirconia was found to be dispersed in the form of particles possessing an average particle diameter of 2 microns. This catalyst was found to contain 0.065 g of platinum and 0.013 g rhodium per carrier piece.

EXAMPLE 72

A finished catalyst was obtained by following the procedure of Example 68, excepting the same metallic monolithic carrier as used in Example 18 was used in the place of the monolithic carrier of cordierite of Example 68.

When the coating layer of this catalyst was examined by the same method as in Example 8, the platinum- and rhodium-containing zirconia was found to be dispersed in the form of particles possessing an average particle diameter of 6 microns. This catalyst was found to contain 0.065 g of platinum and 0.013 g of rhodium per carrier piece.

EXAMPLE 73

An alumina powder containing $CeO_2$ and $Fe_2O_3$ was obtained by dissolving 25.2 g of cerium nitrate ($Ce(NO_3)_3 \cdot 6H_2O$) and 10.1 g of ferric nitrate ($Fe(NO_3)_3 \cdot 9H_2O$) in 100 g of purified water, mixing the resultant solution with 127 g of an activated alumina possessing a specific surface area of $100 m^2/g$, drying the resultant mixture overnight at 120° C., and then calcining the dried mixture in the air at 700° C. for 1 hour.

A finished catalyst was obtained by following the procedure of Example 65, excepting the $CeO_2$- and $Fe_2O_3$-containing alumina was used in the place of 139 g of the activated alumina of Example 68.

When the coating layer of this catalyst was examined by the same method as in Example 8, the same platinum- and rhodium-containing zirconia was found to be dispersed in the form of particles possessing an average particle diameter of 5 microns. This catalyst was found to contain 0.065 g of platinum and 0.013 g of rhodium.

EXAMPLE 74

A finished catalyst was obtained by following the procedure of Example 68, excepting 75 g of the same alumina-modified cerium oxide as in Example 21 was used in the place of the commercially available cerium oxide used in Example 68.

When the coating layer of this catalyst was examined by the same method as in Example 8, the same platinum-containing zirconia and the rhodium-containing zirconia were found to be dispersed both in the form of particles possessing an equal average particle diameter of 3 microns. This catalyst was found to contain 0.065 g of platinum and 0.013 g of rhodium per carrier piece.

EXAMPLE 75

A finished catalyst was obtained by following the procedure of Example 68, excepting 75 g of the same alumina-modified cerium oxide as in Example 22 was used in the place of the commercially availabble cerium oxide powder used in Example 68.

When the coating layer of the catalyst was examined by the same method as in Example 8, the platinum-containing zirconia and the rhodium-containing zirconia were found to be dispersed both in the form of particle possessing an equal average particle diameter of 1 microns. This catalyst was found to contain 0.065 g of platinum and 0.013 g of rhodium per carrier piece.

EXAMPLE 76

A finished catalyst was obtained by following the procedure of Example 68, excepting 75 g of the same alumina-modified cerium oxide as in Example 23 was used in the place of the commercially availabble cerium oxide powder used in Example 68.

When the coating layer of the catalyst was examined by the same method as in Example 8, the platinum-containing zirconia and the rhodium-containing zirconia were found to be dispersed both in the form of particle possessing an equal average particle diameter of 1 micron. This catalyst was found to contain 0.065 g of platinum and 0.013 g of rhodium per carrier piece.

CONTROL 21

An aqueous slurry for coating was prepared by wet pulverizing 150 g of the same activated alumina possessing a specific surface area of $100 m^2/g$ as used in Example 68 and 75 g of a commercially avilable cerium oxide powder in a ball mill for 20 hours.

A finished catalyst was obtained by coating a monolithic carrier of cordierite with the aqueous slurry for coating in the same manner as in Example 68, immersing the carrier coated with the activated alumina and the cerium oxide in a mixture of an aqueous solution of the nitrate of dinitro-diammine platinum and an aqueous rhodium nitrate soltuion, removing the carrier from the mixture, blowing the carrier with compressed air to remove excess solution, drying the wet carrier at 130° C. for 3 hours, and then calcining the dried carrier in the air at 400° C. for 2 hours.

When the coating layer of this catalyst was examined by the same method as in Example 8, neither platinum nor rhodium was found to be dispersed in the form of particles exceeding 0.5 micron in diameter. This catalyst was found to contain 0.065 g of platinum and 0.013 g of rhodium per carrier piece.

CONTROL 22

An aqueous slurry for coating was prepared by wet pulverizing 150 g of the same zirconia possessing specific surface area of $60 m^2/g$ and an average particle diameter of 200 A as used in Example 68 and 75 g a commercially available cerium oxide powder in a ball mill for 20 hours.

A finished catalyst was obtained by coating a monolithic carrier of cordierite with the aqueous slurry for coating in the same manner as in Example 68 and depositing platinum and rhodium on the carrier coated with the zirconia and the cerium oxide in the same manner as in Control 21.

When the coating layer of this catalyst was examined by the same method as in Example 8, neither platinum nor rhodium was found to be dispersed in the form of particles exceeding 0.5 micron in diameter This catalyst was found to contain 0.065 g of platinum and 0.013 g of rhodium per carrier piece.

EXAMPLE 77

The catalysts of Examples 68 through 76 and the catalyts of Controls 21 and 22 were tested for catalytic property after aging in an electric furnace and for catalytic activity after endurance test in an engine in the same manner as in Example 15. The results are shown in Table 19 and 20.

TABLE 19

| | Evaluation of catalytic property after aging in electric furnace | | | | |
|---|---|---|---|---|---|
| | Three way performance Crossover point | | Purifying property at low temperatures | | |
| | | | CO purifying | HC purifying | NO purifying |
| Catalyst | CO,NO purifying ratio (%) | HC purifying ratio (%) | temperature $T_{50}$ (°C.) | temperature $T_{50}$ (°C.) | temperature $T_{50}$ (°C.) |
| Example | | | | | |
| 68 | 90 | 91 | 375 | 380 | 372 |
| 69 | 91 | 93 | 370 | 376 | 367 |
| 70 | 90 | 92 | 374 | 380 | 370 |
| 71 | 88 | 90 | 377 | 381 | 374 |
| 72 | 89 | 91 | 372 | 377 | 369 |
| 73 | 87 | 88 | 380 | 386 | 377 |

TABLE 19-continued

Evaluation of catalytic property after aging in electric furnace

| Catalyst | Three way performance Crossover point CO,NO purifying ratio (%) | Three way performance Crossover point HC purifying ratio (%) | Purifying property at low temperatures CO purifying temperature $T_{50}$ (°C.) | Purifying property at low temperatures HC purifying temperature $T_{50}$ (°C.) | Purifying property at low temperatures NO purifying temperature $T_{50}$ (°C.) |
|---|---|---|---|---|---|
| 74 | 95 | 96 | 361 | 366 | 356 |
| 75 | 93 | 95 | 363 | 368 | 359 |
| 76 | 93 | 94 | 362 | 368 | 357 |
| Control |  |  |  |  |  |
| 21 | 61 | 66 | 445 | 449 | 443 |
| 22 | 58 | 63 | 450 | 455 | 448 |

TABLE 20

Evaluation of catalytic property after test run of engine

| Catalyst | Three way performance Crossover point CO,NO purifying ratio (%) | Three way performance Crossover point HC purifying ratio (%) | Purifying property at low temperatures CO purifying temperature $T_{50}$ (°C.) | Purifying property at low temperatures HC purifying temperature $T_{50}$ (°C.) | Purifying property at low temperatures NO purifying temperature $T_{50}$ (°C.) |
|---|---|---|---|---|---|
| Example |  |  |  |  |  |
| 68 | 88 | 94 | 347 | 352 | 340 |
| 69 | 85 | 91 | 358 | 365 | 350 |
| 70 | 87 | 93 | 353 | 360 | 344 |
| 71 | 88 | 94 | 343 | 350 | 335 |
| 72 | 89 | 95 | 346 | 353 | 340 |
| 73 | 89 | 94 | 343 | 349 | 336 |
| 74 | 96 | 98 | 338 | 344 | 330 |
| 75 | 94 | 97 | 342 | 348 | 335 |
| 76 | 94 | 97 | 341 | 346 | 334 |
| Control |  |  |  |  |  |
| 21 | 70 | 81 | 395 | 402 | 390 |
| 22 | 65 | 76 | 401 | 410 | 395 |

It is clearly noted from Table 19 and Table 20 that the catalysts of Examples 68 through 76 in which zirconia powders having platinum, palladium, and rhodium deposited in high ratios as contemplated by the present invention were dispersed in the coating layers in the form of coherent particles having an average particle diameter in the range of 0.5 to 20 microns invariably exhibited very satisfactory catalytic properties as compared with the catalyst of Controls 21 and 22 which had noble metals deposited in the conventional state.

The catalysts of Examples 74 through 76 which used alumina-modified cerium oxides exhibited still better catalytic properties.

From the results given above, it is clear that the catalysts of the present invention incur only slight deterioration and possess outstanding durability under ordinary operating conditions of engine and even under harsh conditions as under a high-temperature oxidative atmosphere.

What is claimed is:

1. A catalyst for purifying exhaust gas comprising a honeycomb carrier of monolithic structure and a coating layer applied on said honeycomb carrier and formed with a catalyst composition comprising (i) a platinum group metal-supporting zirconia produced by depositing said platinum group metal on zirconia powder, (ii) a refractory inorganic oxide and (iii) a rare earth metal oxide, wherein said platinum group metal is at least one member selected from the group consisting of (a) rhodium, (b) combination of rhodium and platinum, (c) combination of rhodium and palladium, and (d) combination of rhodium, platinum and palladium, and is deposited in proportion in the range of 0.5 to 30% by weight on said zirconia powder.

2. A catalyst according to claim 1, wherein said zirconia powder has a specific surface area of at least 10 $m^2/g$ and an average particle diameter of not more than 2,000 Å as primary particles.

3. A catalyst according to claim 1, wherein the content of said zirconia powder in said catalyst composition is in the range of 0.5 to 50% by weight.

4. A catalyst according to claim 1, wherein said refractory inorganic oxide is activated alumina.

5. A catalyst according to claim 1, wherein said refractory inorganic oxide contains at least one member selected from the group consisting of cerium, lanthanum, and neodymium in proportion in the range of 0.1 to 30% by weight to said refractory inorganic oxide.

6. A catalyst according to claim 5, wherein said refractory inorganic oxide is activated alumina.

7. A catalyst according to claim 1, wherein said rare earth metal oxide is cerium oxide.

8. A catalyst according to claim 7, wherein the content of cerium oxide in said catalyst composition is in the range of 5 to 80% by weight.

9. A method for the production of a catalyst for purifying exhaust gas, which comprises coating a honeycomb carrier of monolithic structure with an aqueous slurry containing (i) a platinum group metal-carrying zirconia, (ii) a refractory inorganic oxide and (iii) a rare earth metal oxide and calcining the resultant coating carrier, wherein said platinum group metal is at least one member selected from the group consisting of (a) rhodium, (b) combination of rhodium and platinum, (c) combination of rhodium and palladium, and (d) combination of rhodium, platinum and palladium and is deposited in a proportion in the range of 0.5 to 30% by weight on said zirconia powder.

10. A catalyst for purifying exhaust gas, consisting essentially of a honeycomb carrier of monolithic structure and a coating layer applied on said honeycomb carrier formed by a catalyst composition consisting of a first refractory inorganic oxide, free of noble metal or rhodium deposited thereon, and at least one second inorganic oxide of the group consisting of (A) at least one refractory inorganic oxide selected from the group consisting of
  (a) a refractory inorganic oxide having deposited thereon 5 to 30% by weight of at least one noble metal selected from the the group consisting of platinum and palladium and
  (b) a refractory inorganic oxide having 1 to 20% by weight of rhodium deposited thereon, and (B) a refractory inorganic oxide having deposited thereon 5 to 30% by weight of at least one noble metal selected from the group consisting of platinum and palladium, and 1 to 20% by weight of rhodium, said second inorganic oxide being in the form of particles possessing an average particle diameter in the range of 0.5 to 20 microns and being dispersed in the said coating layer, and (C) cerium oxide, free of noble metal or rhodium deposited thereon, and provided that where a member of group (C) is selected as a second inorganic oxide, at least one group (A) member or at least one group (B) member also must be present wherein the amount of said second inorganic oxide having deposited thereon noble metal or rhodium is less than about 28.6% by weight of total refractory oxides.

11. A catalyst according to claim 10, wherein the amount of said noble metal-carrying refractory inorganic oxide is in the range of 1 to 20 g per liter of said carrier.

12. A catalyst according to claim 10, wherein at least one noble metal selected from the group consisting of platinum and palladium is deposited in an amount in the range of 10 to 20% by weight and rhodium in an amount in the range of 1 to 10% by weight, respectively based on the amount of said refractory inorganic oxide.

13. A catalyst according to claim 10, wherein said refractory inorganic oxide is at least one member selected from the group consisting of alumina, silica, titania, zirconia, alumina-silica, alumina-titania, alumina-zirconia, silica-titania, silica-zirconia, titania-zirconia, and alumina-magnesia.

14. A catalyst according to claim 13, wherein said refractory inorganic oxide is alumina or zirconia.

15. A catalyst according to claim 14, wherein said alumina is activated alumina.

16. A catalyst according to claim 15, wherein said activated alumina possesses a specific surface area in the range of 5 to 200 m$^2$/g.

17. A catalyst according to claim 14, wherein said zirconia possesses a specific surface area of at least 10 m$^2$/g and an average particle diameter of not more than 2,000 Å as primary particles.

18. A catalyst according to claim 10, wherein a refractory inorganic oxide having no noble metal deposited thereon is incorporated additionally.

19. A catalyst according to claim 18, wherein the amount of said refractory inorganic oxide containing no deposited noble metal is in the range of 50 to 200 g per liter of said carrier.

20. A catalyst according to claim 18, wherein the refractory inorganic oxide containing no deposited noble metal is at least one member selected from the group consisting of alumina, silica, titania, zirconia, alumina-silica, alumina-titania, alumina-zirconia, silica-titania, silica-zirconia, titania-zirconium, and alumina-magnesia.

21. A catalyst according to claim 20, wherein said refractory inorganic oxide containing no deposited noble metal is activated alumina.

22. A catalyst according to claim 21, wherein said activated alumina possesses a specific surface area in the range of 5 to 200 m$^2$/g.

23. A catalyst according to claim 10, wherein said catalyst composition further incorporates therein cerium oxide.

24. A catalyst according to claim 23, wherein said cerium oxide is incorporated in said catalyst composition in an amount in the range of 1 to 150 g as $CeO_2$ per liter of said carrier.

25. A catalyst according to claim 23, wherein said cerium oxide is an alumina-modified cerium oxide obtained by impregnating a water-insoluble cerium compound with at least one member selected from the group consisting of water-soluble aluminum compounds and alumina hydrates and calcining the resultant impregnation product.

26. A catalyst according to claim 25, wherein said water-insoluble cerium compound is selected from the group consisting of cerium carbonate, cerium oxide, and cerium hydroxide and said water-soluble aluminum compound is selected from the group consisting of aluminum nitrate, aluminum chloride, and aluminum sulfate.

27. A catalyst according to claim 25, wherein said alumina-modified cerium oxide has cerium and aluminum components thereof contained therein at an atomic ratio, Ce/Al, in the range of 1 to 20.

28. A catalyst according to claim 23, wherein a refractory inorganic oxide having no noble metal deposited thereon is further incorporated.

29. A catalyst according to claim 28, wherein the amount of said refractory inorganic oxide containing no deposited noble metal is in the range of 50 to 200 g per liter of said carrier.

30. A catalyst according to claim 28, wherein said refractory inorganic oxide containing no deposited noble metal is at least one member selected from the group consisting of alumina, silica, titania, zirconia, alumina-silica, alumina-titania, alumina-zirconia, silica-titania, silica-zirconia, titania-zirconia, and alumina-magnesia.

31. A catalyst according to claim 30, wherein said refractory inorganic oxide containing no deposited noble metal is activated alumina.

32. A catalyst according to claim 31, wherein said activated alumina possesses a specific surface area in the range of 5 to 200 m$^2$/g.

33. A catalyst according to claim 10, wherein said second inorganic oxide of said catalyst composition is selected from the group consisting of
(A) the combination of
  (a) a refractory inorganic oxide having 5 to 30% by weight of platinum deposited thereon and
  (b) a refractory inorganic oxide having 1 to 20% by weight of rhodium deposited thereon and
(B) a refractory inorganic oxide having 5 to 30% by weight of platinum and 1 to 20% by weight of rhodium deposited thereon in the form of particles possessing an average particle diameter in the range of 0.5 to 20 microns.

34. A catalyst according to claim 33, wherein said refractory inorganic oxide is alumina.

35. A catalyst according to claim 10, wherein said catalyst composition contains either (A) at least one zirconia selected from the group consisting of (a) zirconia having deposited thereon 5 to 30% by weight of at least one noble metal selected from the group consisting of platinum and palladium and (b) zirconia having 1 to 20% by weight of rhodium deposited thereon or (B) zirconia having deposited therein 5 to 30% by weight of at least one noble metal selected from the group consisting of platinum and palladium and 1 to 20% by weight of rhodium, in the form of particles possessing an average particle diameter in the range of 0.5 to 20 microns.

36. A method for the production of a catalyst for purifying exhaust gas, which consisting essentially of coating a honeycomb carrier of monolithic structure with an aqueous slurry containing a catalyst composition and subsequently calcining the coated carrier, said catalyst composition consisting of a first refractory inorganic oxide free of noble metal or rhodium deposited thereon, and a second inorganic oxide selected from the group consisting of
(A) at least one refractory inorganic oxide selected from the group consisting of
  (a) a refractory inorganic oxide having deposited thereon 5 to 30% by weight of at least one noble metal selected from the group consisting of platinum and palladium and (b) a refractory inorganic oxide having 1 to 20% by weight of rhodium deposited thereon and (B) a refractory inorganic oxide having deposited thereon 5 to 30% by weight of at least one noble metal selected from the group consisting of platinum and palladium and 1 to 20% by weight of rhodium, in the form of particles possessing an average particle diameter in the range of 0.5 to 20 microns wherein the amount of said second inorganic oxide having deposited thereon noble metal or rhodium is less than about 28.6% by weight of total refractory oxides.

37. A method according to claim 36, wherein said calcination is carried out at a temperature in the range of 100° to 600° C.

* * * * *